United States Patent [19] [11] 4,317,168
// Messina et al. [45] Feb. 23, 1982

[54] CACHE ORGANIZATION ENABLING CONCURRENT LINE CASTOUT AND LINE FETCH TRANSFERS WITH MAIN STORAGE

[75] Inventors: Benedicto U. Messina, Poughkeepsie; William D. Silkman, Hopewell Junction, both of N.Y.

[73] Assignee: International Business Machines Corporation, Armonk, N.Y.

[21] Appl. No.: 96,860

[22] Filed: Nov. 23, 1979

[51] Int. Cl.³ ............................................. G06F 13/00
[52] U.S. Cl. .................................................. 364/200
[58] Field of Search ... 364/200 MS File, 900 MS File

[56] References Cited

U.S. PATENT DOCUMENTS

| 3,569,938 | 3/1971 | Eden et al. | 364/200 |
| 3,588,829 | 6/1971 | Boland et al. | 364/200 |
| 3,670,307 | 6/1972 | Arnold et al. | 364/200 |
| 3,670,309 | 6/1972 | Amdahl et al. | 364/200 |
| 4,169,284 | 9/1979 | Hogan et al. | 364/200 |
| 4,197,580 | 4/1980 | Chang et al. | 364/200 |
| 4,208,716 | 6/1980 | Porter et al. | 364/200 |

FOREIGN PATENT DOCUMENTS 50-24260 4/1975 Japan .

*Primary Examiner*—Raulfe B. Zache
*Attorney, Agent, or Firm*—Bernard M. Goldman

[57] ABSTRACT

A cache organization that enables many cache functions to overlap without extending line fetch or line castout time and without requiring a cache technology faster than the processor technology. Main storage has a data bus-out and a data bus-in, each transferring a double word (DW) in one cycle. Both busses may transfer respective DWs in opposite directions in the same cycle. The cache has a quadword (QW) write register and a QW read register, a QW being two DWs on a QW address boundary. During a line fetch (LF) of 16DWs, either the first pair of DWs, or the first DW of the LF is loaded into the QW write register, depending on whether the first DW is on a QW address boundary or not, i.e., whether the fetch request address bit 28 is even or odd, respectively. Thereafter during the LF, the even and odd DWs are formed into QWs as received from the bus-out, and the QWs are written into the cache on alternate cycles, wherein no QW cache access occurs on the other alternate cycles for the LF. Either 8 or 9 QWs occur for a LF depending on the first DW boundary alignment. For a LF with 9 QWs, a write inhibit is needed for a non-data odd DW position in the last QW to avoid destroying the first DW written in the cache. If a line castout (CO) is required from the same or a different location in the cache, the CO can proceed during the alternate non-write cycles of any LF. Any cache bypass to the processor during the LF can overlap the LF and CO. Any alternate cycles during any LF, which are not used for a CO or LF bypass, are available for processor request accesses of the cache for either DWs or QWs.

40 Claims, 22 Drawing Figures

FIG. 1
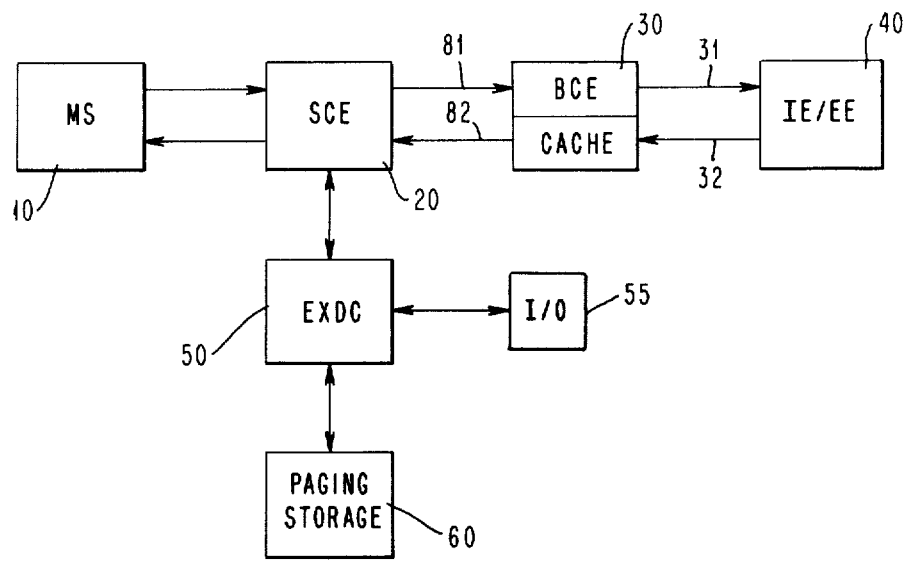
FIG. 3  NORMAL FETCH REQUEST
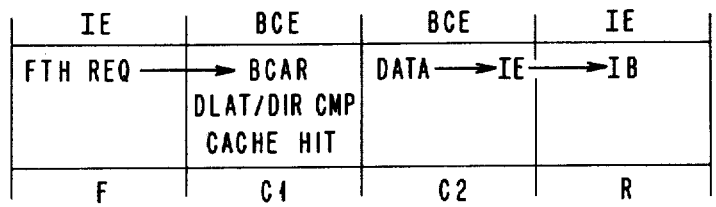
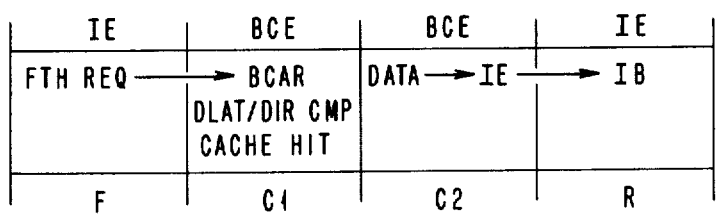
FIG. 2
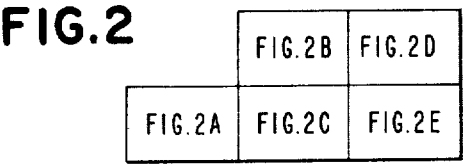

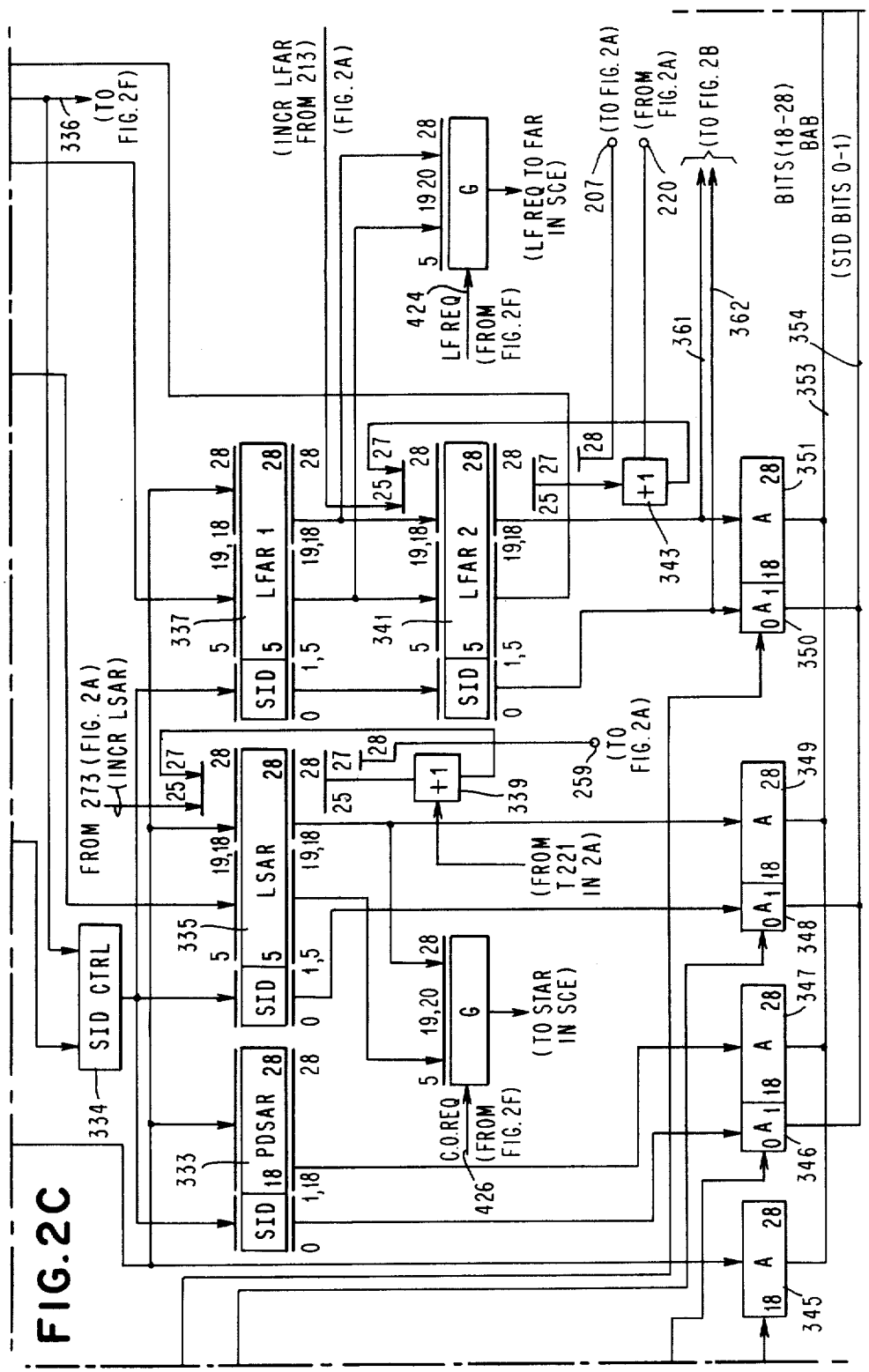

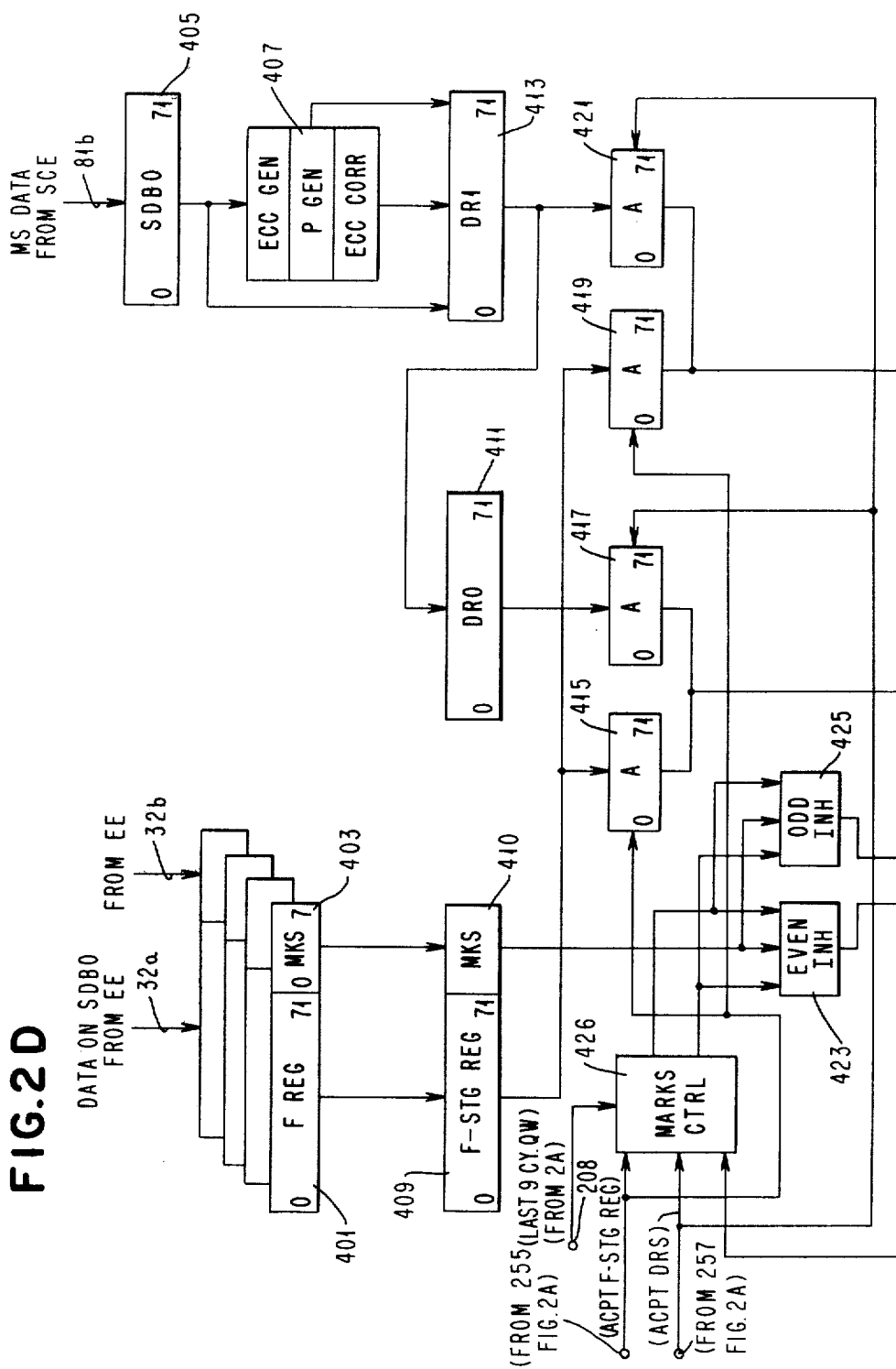

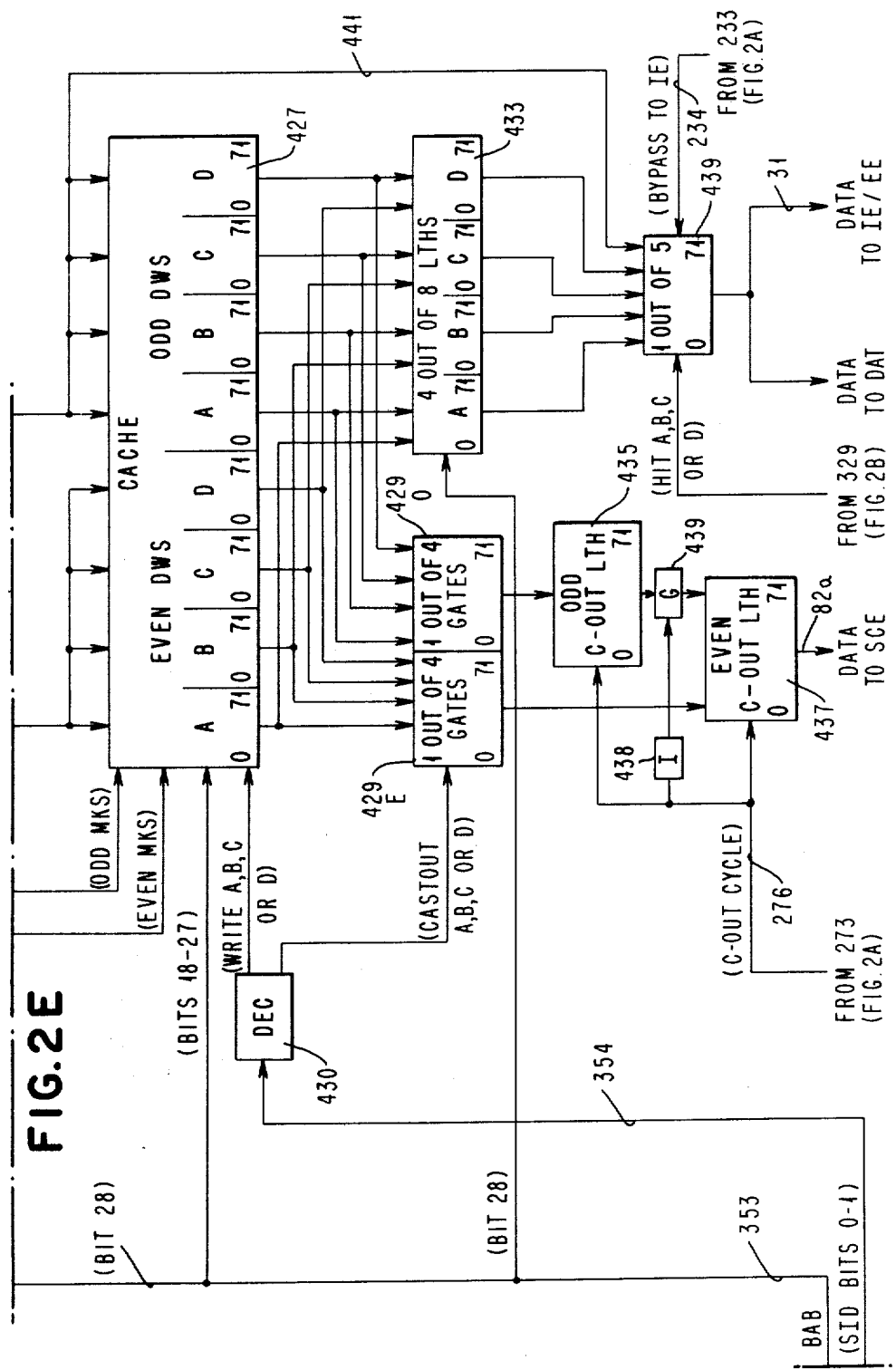

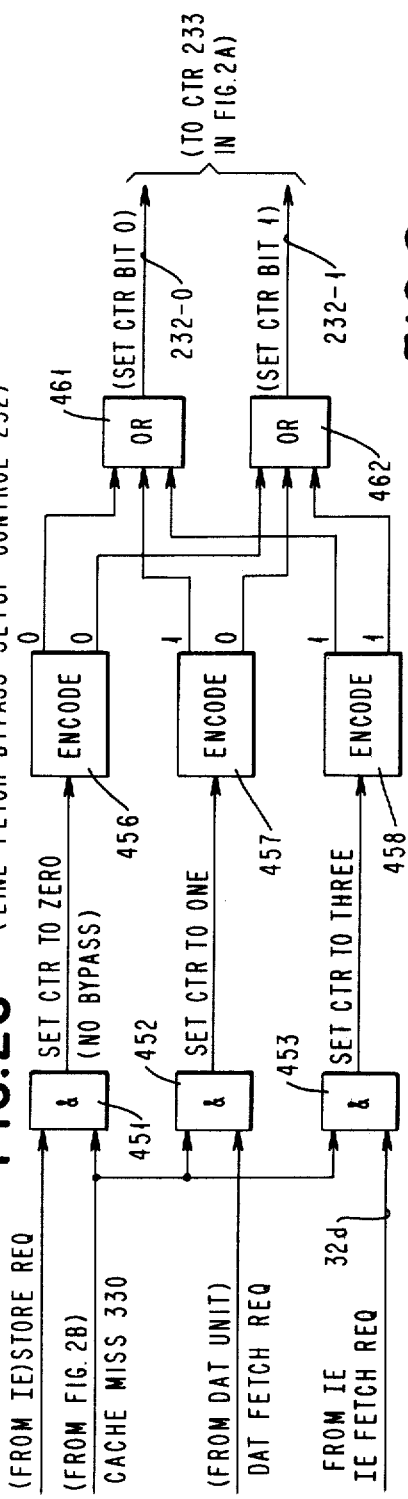
FIG.2G (LINE FETCH BYPASS SETUP CONTROL 232)
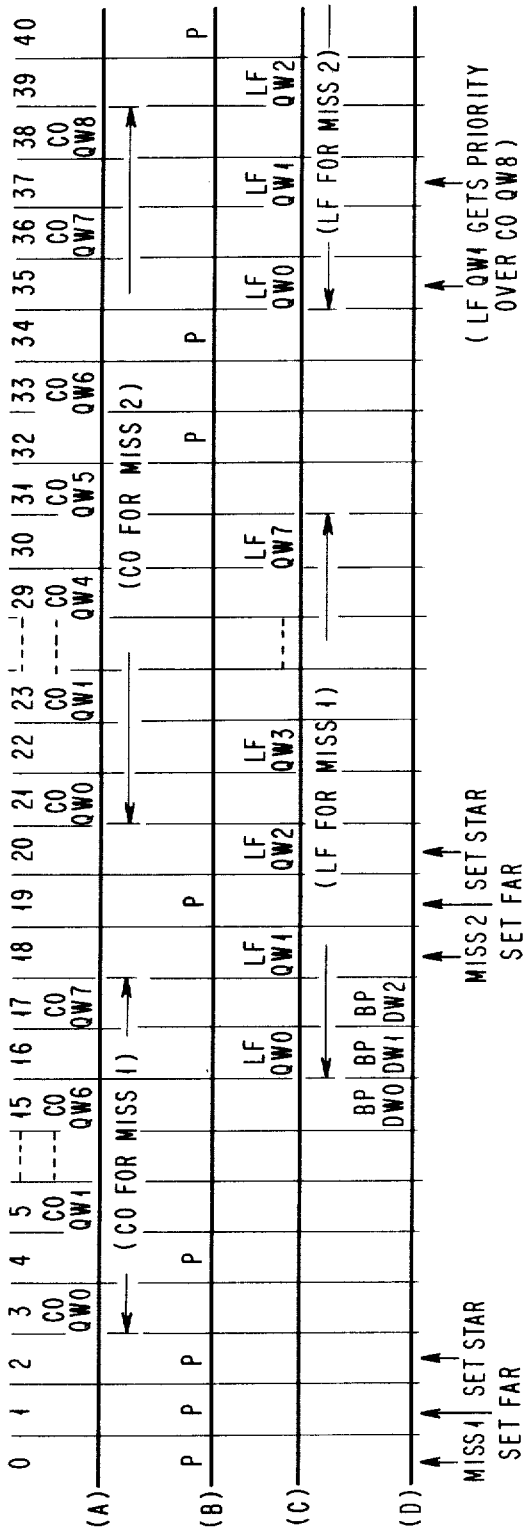
FIG.8

FIG. 4 DELAYED FETCH REQUEST (DLAT MISS WITH CACHE HIT)
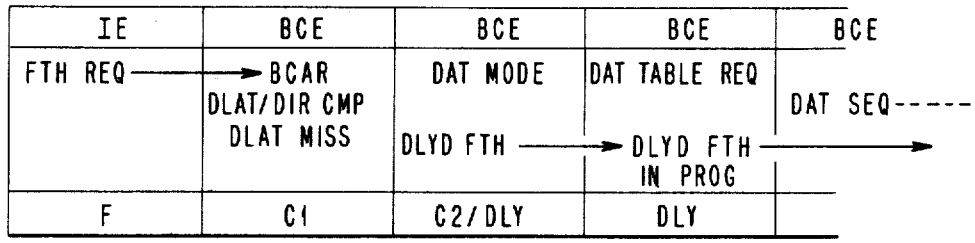
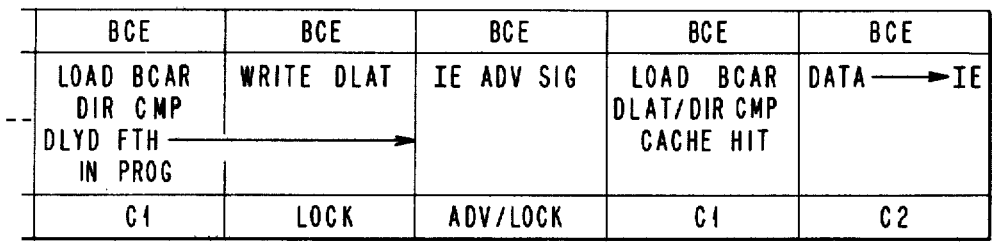
FIG. 6 NORMAL STORE REQUEST (DLAT HIT & CACHE HIT)
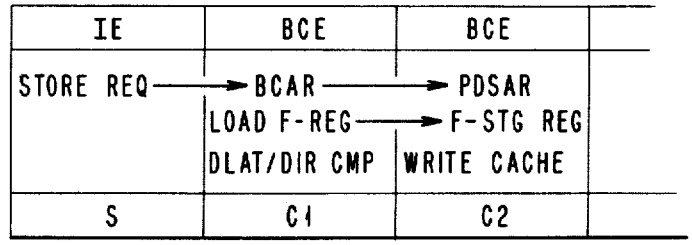
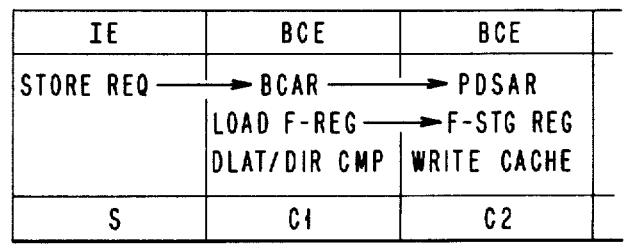

FIG. 5

DELAYED FETCH REQUEST
(DLAT HIT & CACHE MISS)

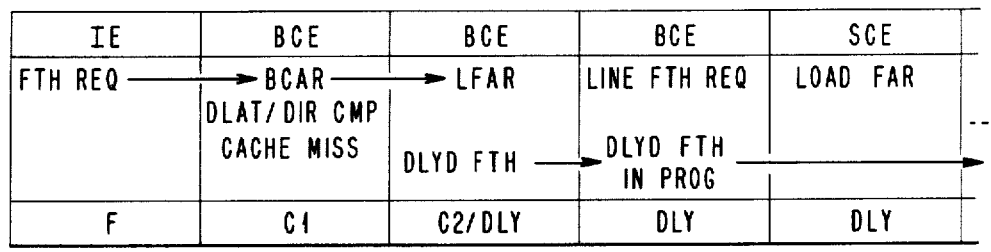

| IE | BCE | BCE | BCE | SCE |
|---|---|---|---|---|
| FTH REQ ──→ | BCAR ──→ DLAT/DIR CMP CACHE MISS | LFAR DLYD FTH ──→ | LINE FTH REQ DLYD FTH IN PROG ──→ | LOAD FAR |
| F | C1 | C2/DLY | DLY | DLY |

──[VARIABLE DELAY (ACCESS TIME + OVERHEAD TO PROCESS REQUEST)]──

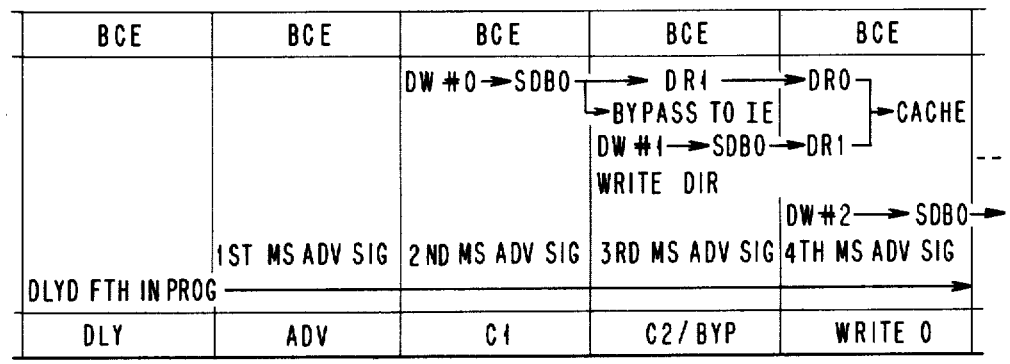

| BCE | BCE | BCE | BCE | BCE |
|---|---|---|---|---|
| | | DW#0→SDBO──→ | DR1 ──→ ↳BYPASS TO IE DW#1→SDBO→DR1 WRITE DIR | DR0┐ DR1┘→CACHE DW#2→SDBO→ |
| DLYD FTH IN PROG ─── | 1ST MS ADV SIG | 2ND MS ADV SIG | 3RD MS ADV SIG | 4TH MS ADV SIG |
| DLY | ADV | C1 | C2/BYP | WRITE 0 |

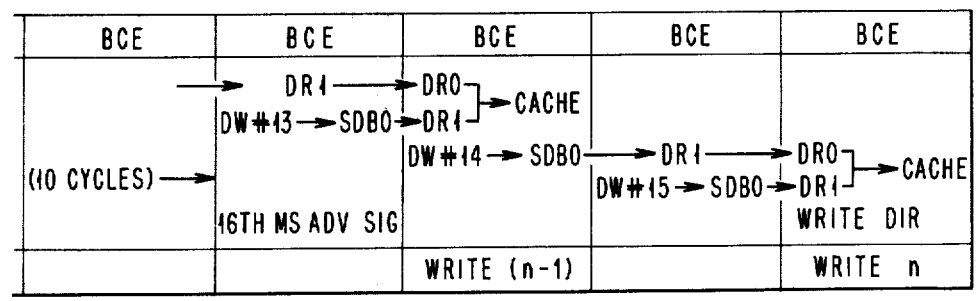

| BCE | BCE | BCE | BCE | BCE |
|---|---|---|---|---|
| (10 CYCLES)──→ | ──→ DR1 ──→ DW#13→SDBO→ | DR0┐ DR1┘→CACHE DW#14→SDBO ──→ | DR1 ──→ DW#15→SDBO→ | DR0┐ DR1┘→CACHE WRITE DIR |
| | 16TH MS ADV SIG | | | |
| | | WRITE (n-1) | | WRITE n |

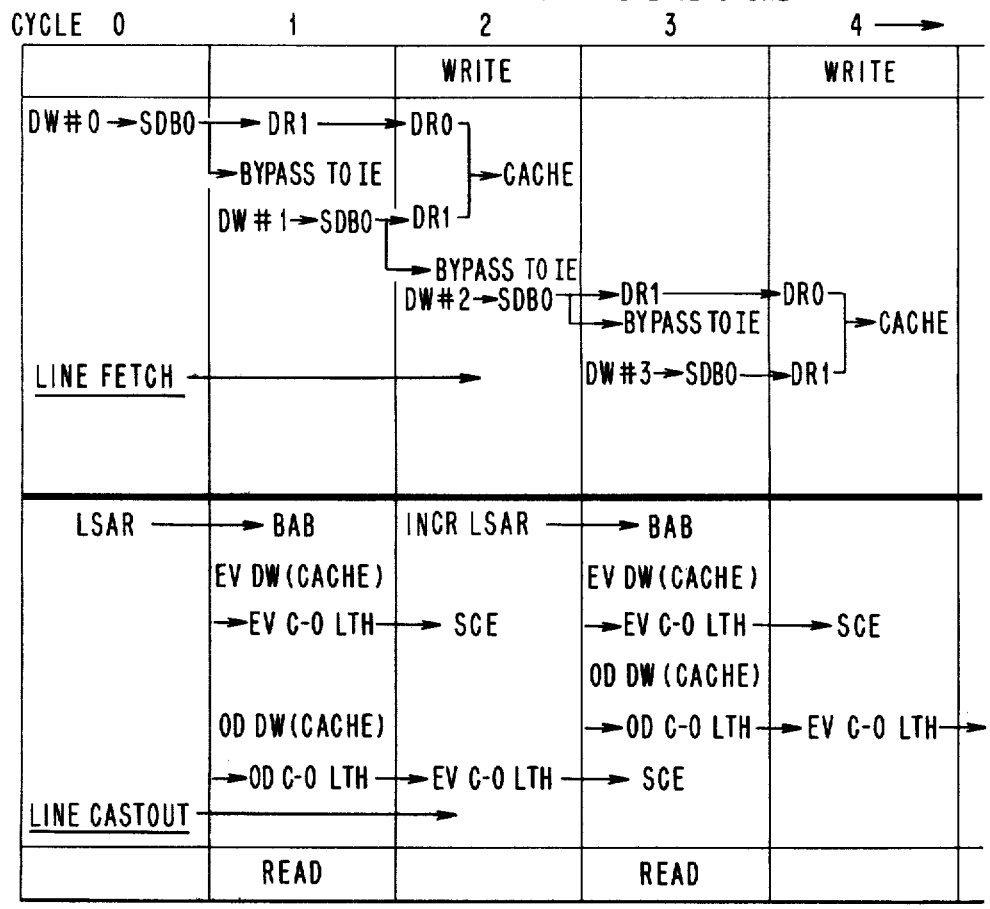
FIG.7 (DLAT HIT & CACHE MISS) INTERLEAVED LINE FETCH AND LINE STORE

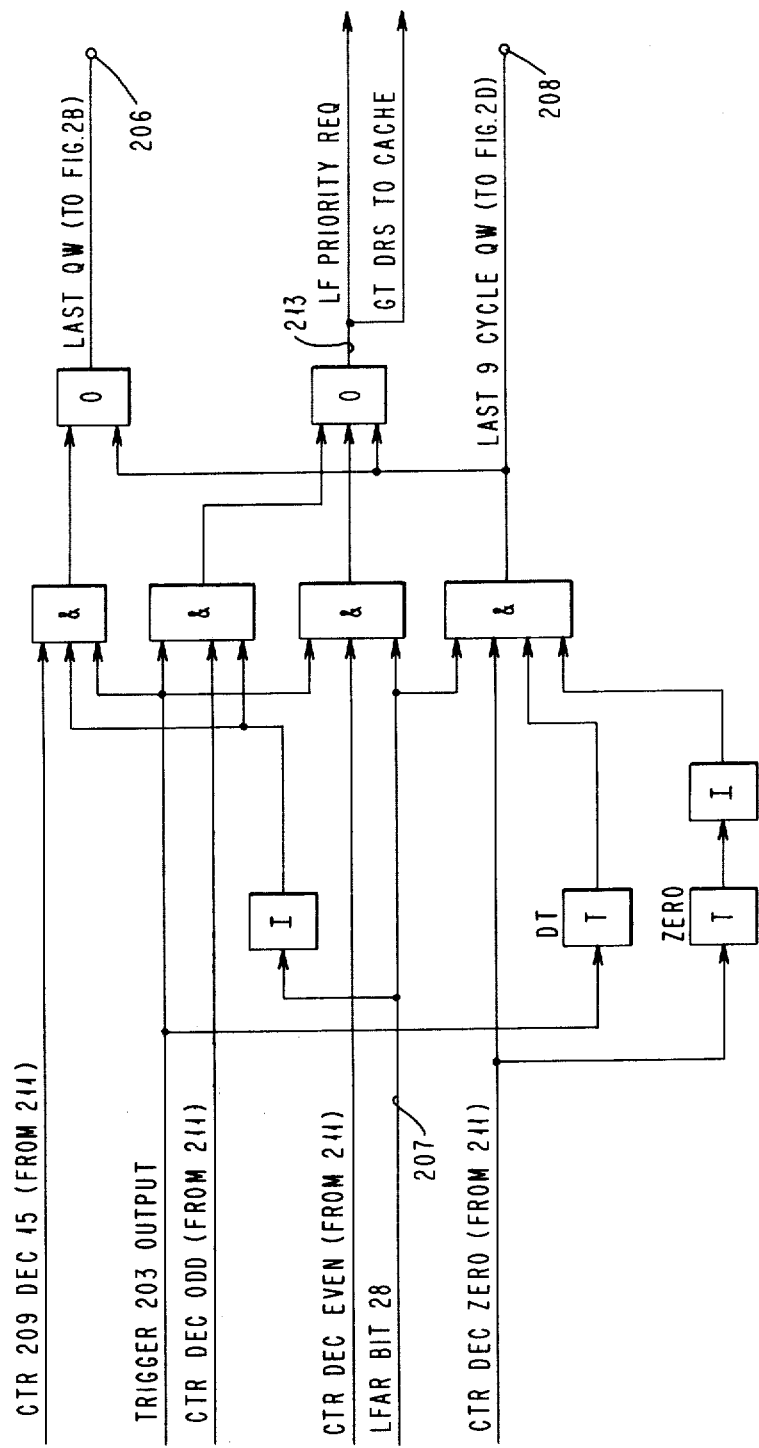
FIG.9A LINE FETCH 8 OR 9 CYCLE CONTROL 209

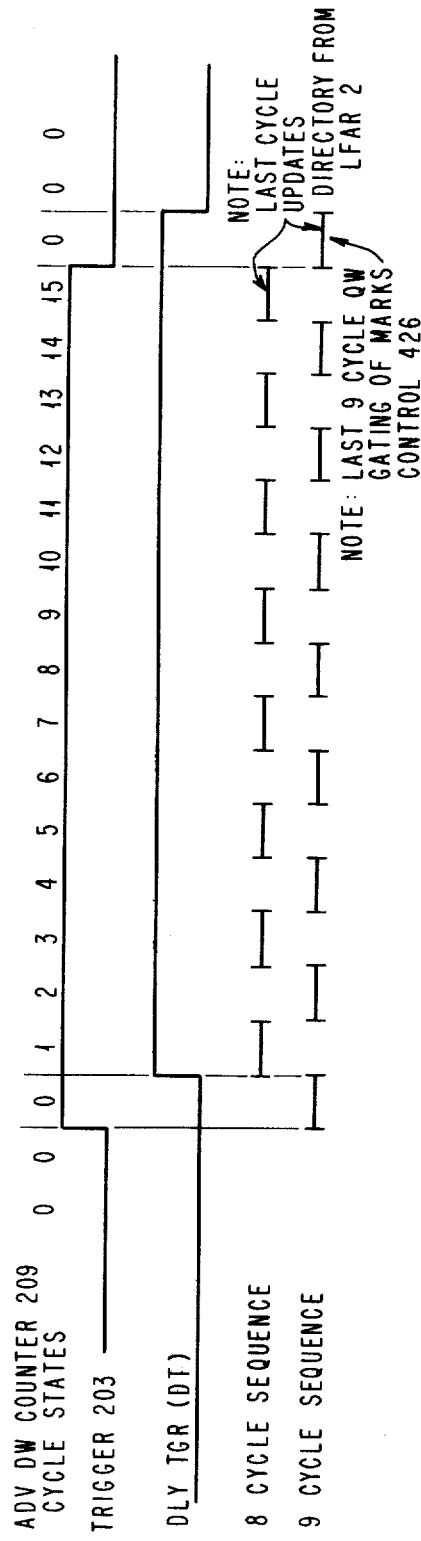

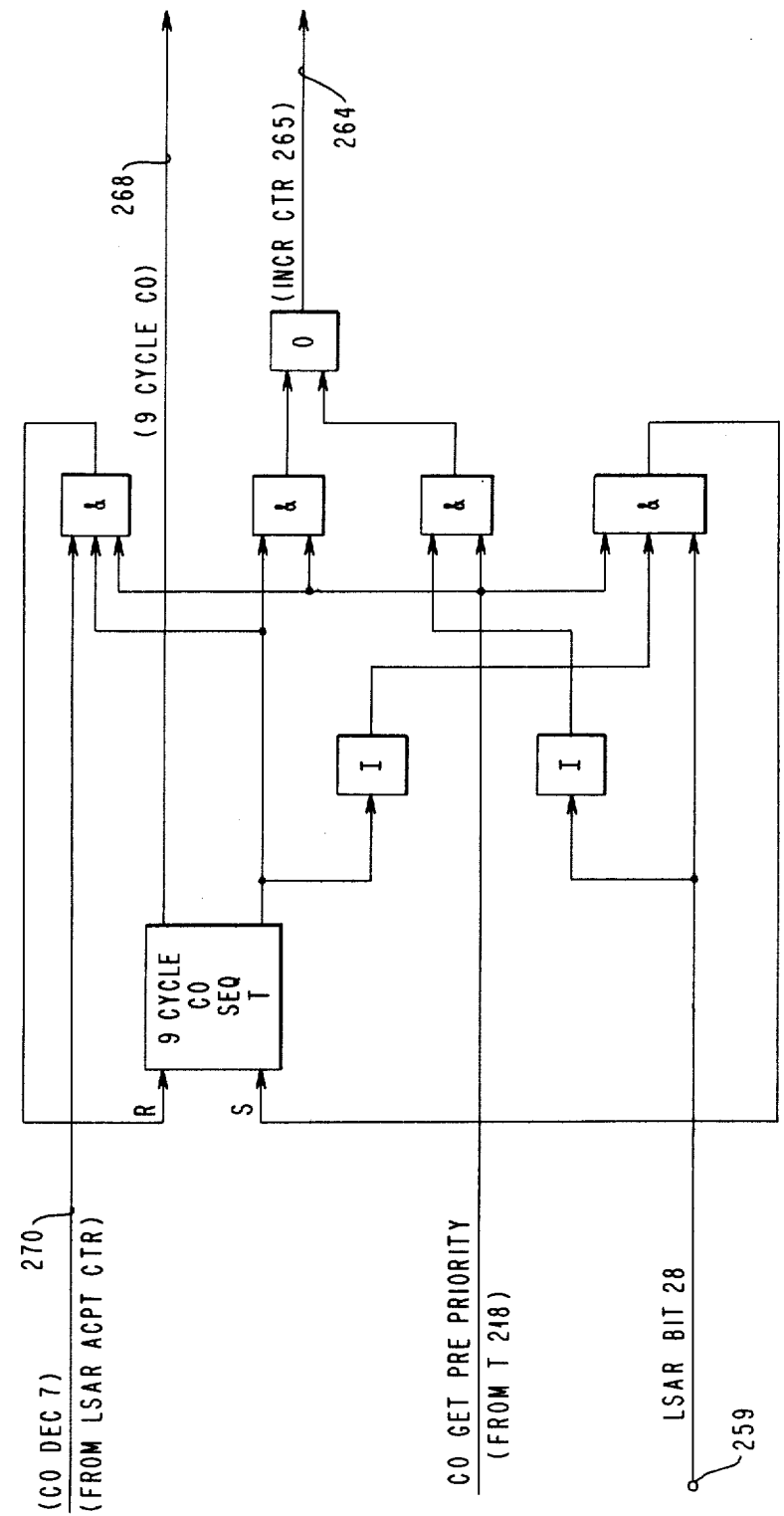
FIG.10A CASTOUT 8 OR 9 CYCLE CONTROL 267

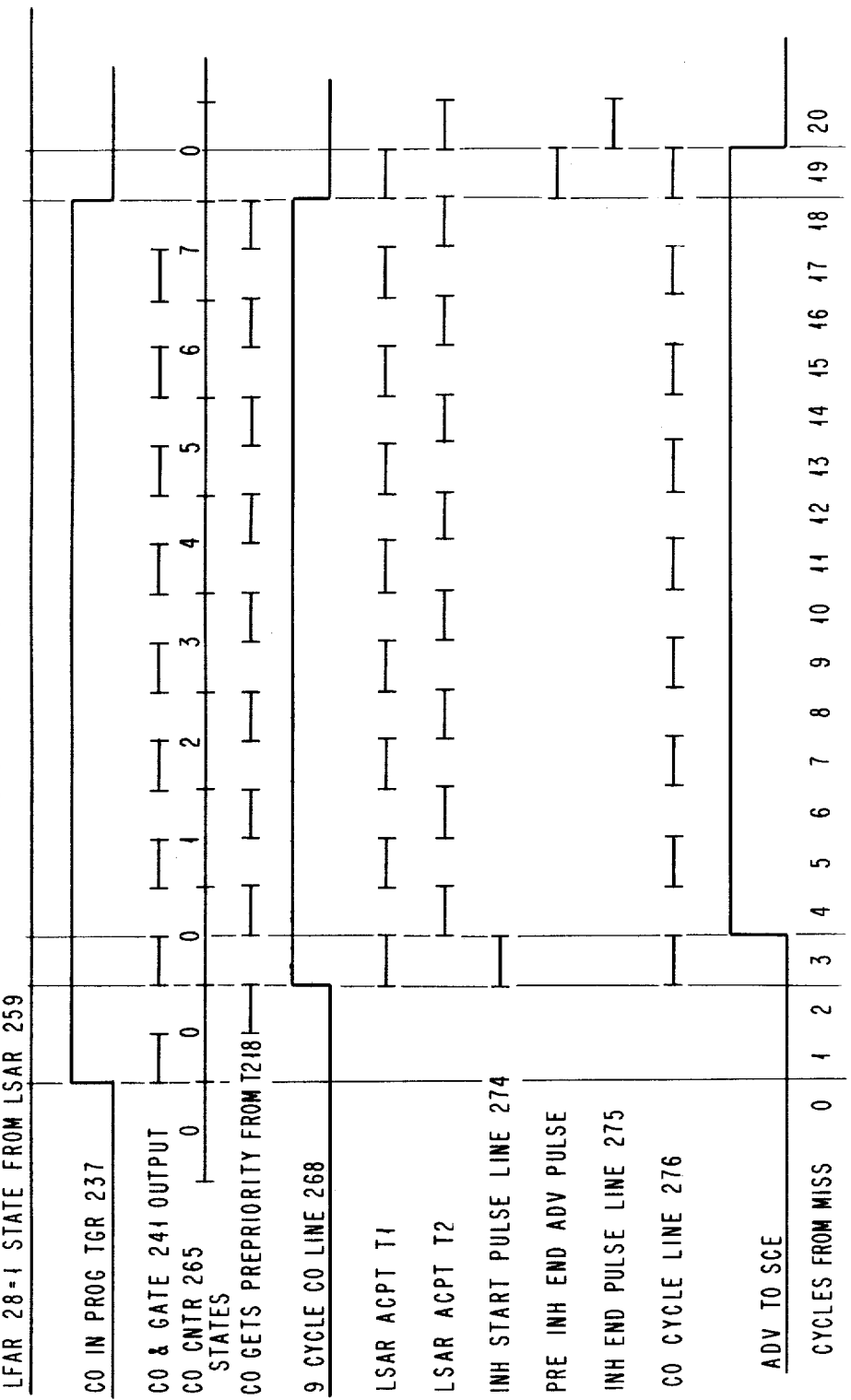

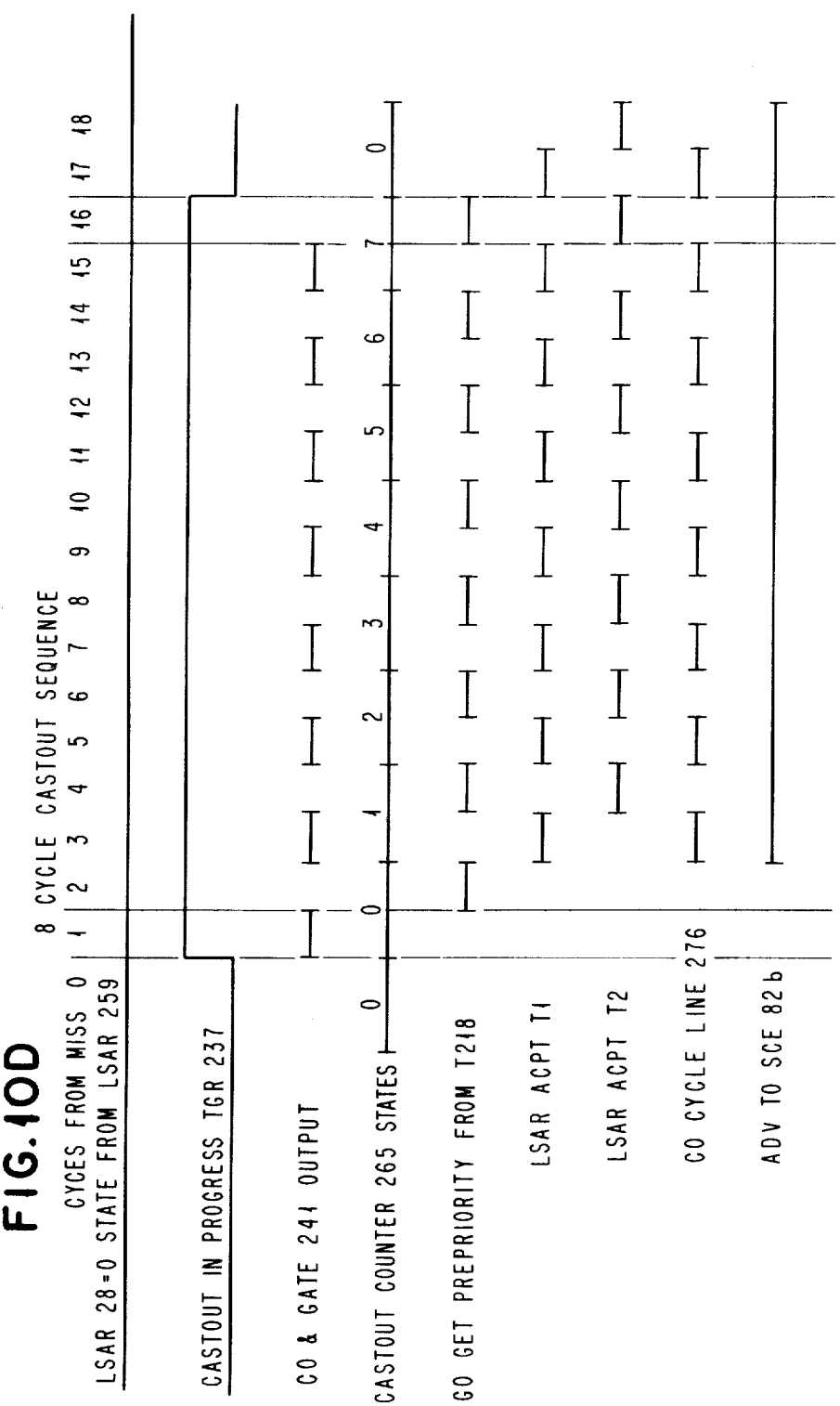

CACHE ORGANIZATION ENABLING CONCURRENT LINE CASTOUT AND LINE FETCH TRANSFERS WITH MAIN STORAGE

BACKGROUND OF THE INVENTION

1. Field of the Invention

The invention relates to improvements in cache organization in a data processing system which permits a main storage line fetch, cache bypass, line castout and processor cache access to all occur concurrently.

2. Description of the Prior Art

U.S. Pat. Nos. 3,670,307 and 3,670,309, both assigned to the same assignee as the present application, teach an interleaved cache with plural BSM's permitting concurrent access of a processor and a main storage to the cache when their accesses are to different BSM's. Accesses to the same BSM cannot occur simultaneously.

U.S. Pat. No. 4,169,284, assigned to the present assignee, enables a processor to access its cache during any cycle of a line fetch by having the cache cycled at twice the rate that doublewords (DWs) are transferred from either the processor or main storage to cache.

Japanese Published Examined Patent Application No. 53-24260, issued Apr. 12, 1975 provides a data buffer (which is often called a line fetch buffer) serially connected between a main storage and a processor cache. The processor may access a different line or block in the cache while the line is being transferred from the main storage to the line fetch buffer but the line being fetched cannot be accessed by the processor until after the line fetch to the buffer is completed. Then, the processor accesses only the line fetch buffer for data in the fetched line. When the next cache miss occurs, a processor wait results until the requested data is received from the main storage. During the processor wait period, the line in the line fetch buffer is transferred to the cache. The processor cannot access the cache during the line fetch buffer-to-cache transfer of the entire line. The fetched line cannot begin to be put into the cache from the line fetch buffer until the castout line is completely stored in the line fetch buffer. The cache addressable unit and the main storage bus have the same path width. Processor-cache access overlap is obtainable with a line fetch.

None of the prior art teaches the concurrent line castout and line fetch transfers with the main storage.

SUMMARY OF THE INVENTION

It is an object of the present invention to provide a cache accessing system which permits concurrent line castout and line fetch transfers with the main storage.

It is another object of the present invention to provide a cache with the same cycle rate as the processor and main storage busses to attain simultaneous transfers by a line fetch and a line castout or processor request without a time penalty paid for the overlap.

It is a further object of this invention to permit concurrent processor access to a cache during either a line fetch or a line castout.

It is still another object of this invention to provide a cache bypass to the processor which overlaps a simultaneously occurring line fetch and line castout.

The invention enables a line fetch transfer to occur at the same time as a line castout transfer or processor request transfer on different cache busses. The line fetch can start as early as two double-words (DW's) after the castout starts for the same line location in the cache, although the line fetch usually starts much later due to the long main storage access time. The processor can access the cache for DW or QW (quadword) accesses during a castout or line fetch, but not while both exist simultaneously. During a cache line fetch of a plurality of DW's, a QW fetch register, which may actually comprise a pair of DW registers, receives odd and even DW's from a DW-wide bus-out from the main storage in two cycles. Then during one cycle the registered QW is then inserted into a QW unit location in the cache. During a cache line castout, odd and even DW's are read out of the cache as a QW in one cycle to respective castout registers, and then they are gated in two cycles to the bus-in to the main storage. Thus, the main storage (MS) can transfer DW units simultaneously during the line fetch and castout on the separate MS buses (i.e. bus-in and bus-out), while the cache is alternately accessing QW units to concurrently handle the simultaneous transfers for both MS busses.

A DW write inhibit for the cache is needed for the last DW position of the last QW of a line fetch (LF) to accommodate a LF which begins with a DW which is not on a QW address boundary, since a LF can begin with any DW in a line. The QW address always aligns with QW address boundaries. Therefore, if the LF begins with a DW on a QW boundary, the DWs are sequentially paired into the QWs. But if the first DW of the LF is not on a QW boundary, the first DW is the only DW in the first QW at the proper DW address boundary, and thereafter the DWs are sequentially paired into QWs, except the last QW has only one DW on its QW address boundary. Hence, the remasking DW position must be inhibited from going into the cache. Thus, a LF sequence of N DWs has either (N/2) or (N/2)+1 number of DWs, depending on whether the first DW in the LF is on a QW boundary or not.

In accordance with the novel cache organization of this invention, a system performance improvement is attained due to the efficient use of cache cycles. Namely, simultaneous line castout and line fetch DW transfer sequences utilize alternate cache access cycles of QWs. When a line fetch is initiated requiring a castout, the castout may continue while the line fetch begins.

Any QW cache access cycles not used by a line castout or line fetch are available for an access by a processor DW or QW request.

A cache bypass DW to the processor during a line fetch may simultaneously occur during a QW castout access of the cache. The cache bypass is controlled to select the number of DWs to be bypassed according to the type of request being made. The bypass path is fabricated inside an array chip, thus effecting a reduction in I/O pins required for routing bypass data to various requestors.

BRIEF DESCRIPTION OF THE DRAWINGS

FIG. 1 shows a configuration diagram of a system to which the present invention is applied.

FIG. 3 shows a timing chart for normal fetch request.

FIG. 4 shows a timing chart for delayed fetch request in case of DLAT miss.

FIG. 5 shows a timing chart for delayed fetch request in case of cache miss.

FIG. 6 shows a timing chart for normal store request.

FIGS. 7 and 8 illustrate timing relationships for line fetch, line store (castout), and bypass transfers.

FIGS. 9A, 9B, 9C, 10A, 10B, 10C and 10D show detailed circuits for special items found in FIG. 2A and their exemplary waveforms.

DESCRIPTION OF THE PREFERRED EMBODIMENT

FIG. 1 shows a basic system configuration to which this invention is applied. It includes a main store (MS) 10, a system control element (SCE) 20, a buffer control element (BCE) 30 including a high-speed buffer called a cache, an instruction element/execution element (IE/EE) 40, an external data controller (EXDC) 50 connecting to I/O 55 and a paging store 60. The "store-in-cache" concept is used in this invention, in which the cache address mechanism is checked to determine if the addressed block is currently in the cache and if not, the addressed block is brought into the cache from the MS 10, and then for a store request the new data is stored into the block in the cache.

The BCE 30 is a part of a central processor (CP) which serves storage requests for the IE/EE (I/E) 40. Additionally, it aids in the execution of a number of system control instructions both locally and remotely through the SCE 20, and performs address translation for logical addresses.

A major role of the BCE 30 is that the cache between the CP and MS 10. The cache allows a two-cycle access time for processor storage requests. Both stores and fetches from the CP are made to the cache, and updates to the MS 10 (called "castouts") are performed only upon request by the SCE 20 or when the BCE 30 must replace changed lines in the cache.

The BCE 30 pursues a high-performance philosophy through the use of a number of design enhancements. It provides a path for line fetches and line castouts from BCE 30 to MS 10 through SCE 20. A bypass path (shown in FIG. 2E) exists around the cache within the BCE 30 for selected line fetch doublewords which are transferred directly from the SCE to the IE while the line fetch is being written into the cache.

Figure 2A:
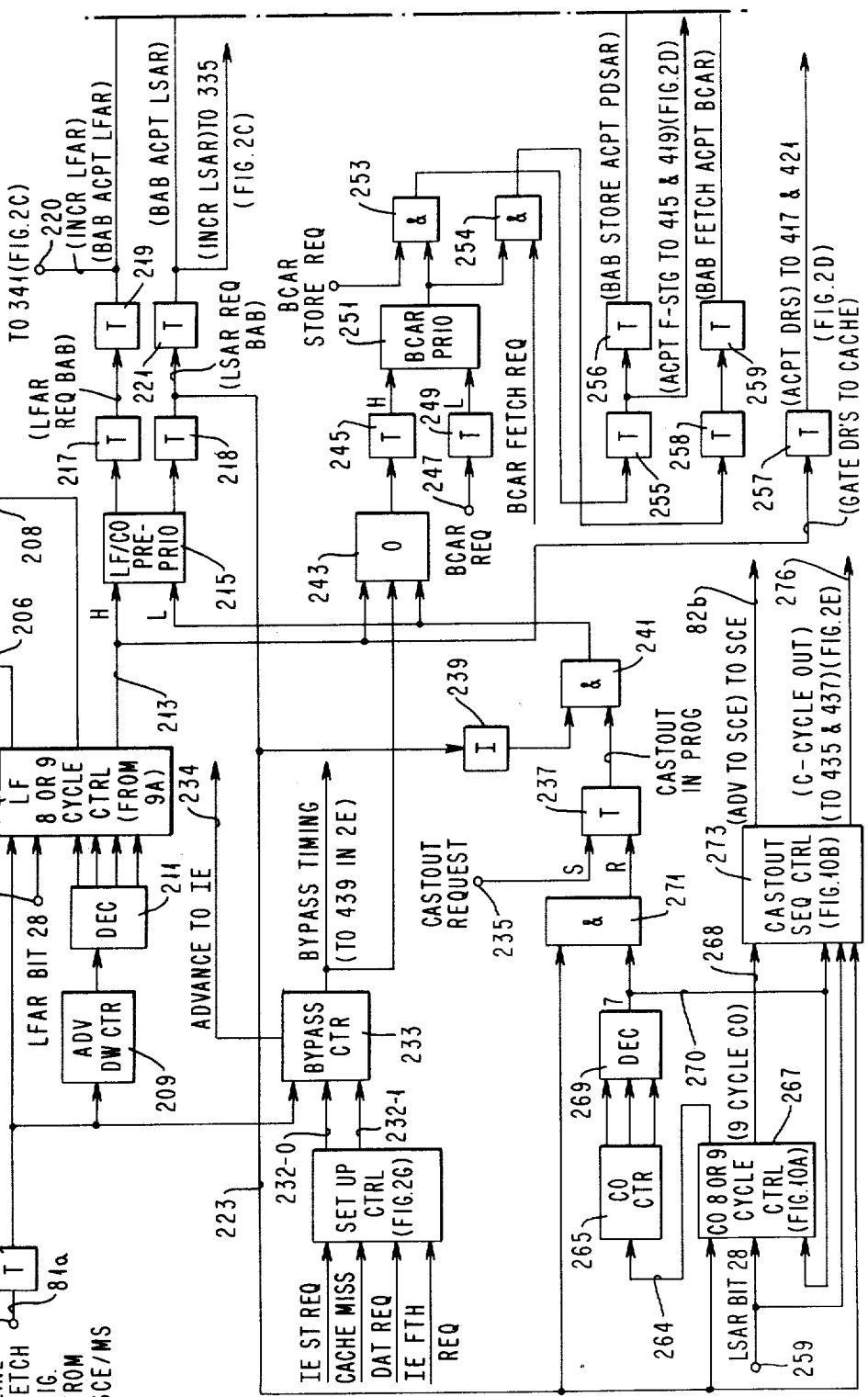
FIG. 2 is a composite diagram of FIGS. 2A–2G which show an embodiment of the present invention.
Figure 2B:
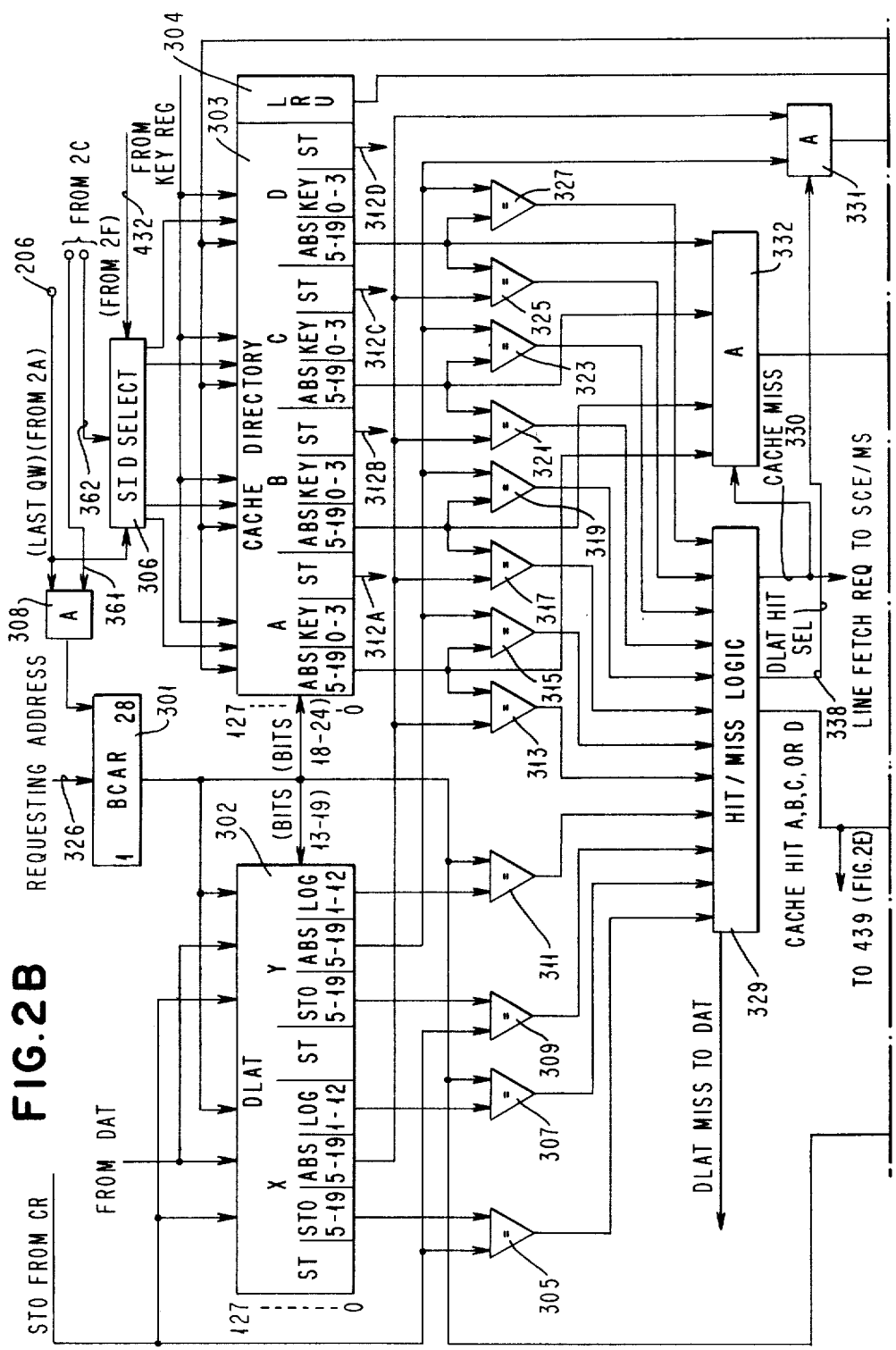

FIGS. 2A through 2E show major elements within the BCE 30 in block diagram form, in which FIG. 2A shows an addressing priority and sequence control circuitry, FIGS. 2B and 2C show an addressing mechanism and FIGS. 2D and 2E show the cache and the data flow to and from the cache.

Referring first to FIGS. 2D and 2E, the cache organization and the data flow are explained.

In a preferred embodiment, the cache 427 (FIG. 2E) is a 64K-byte random-access array that is packaged on a single module. It is addressed direcly by logical address bits (bits 18–28). The cache directory (FIG. 2B) is organized on a line basis. There are 512 lines in the cache, each line having 128 bytes or 16 doublewords (DW's) of information addressed on a quadword (QW) basis. Data can be read out of the cache 427 a DW (8 bytes) at a time, and can be written into the cache 427 either a DW or a quadword (QW = 16 bytes) at a time from the SCE. The EE can write one to eight bytes per store operation depending on the setting of mark bits in mark bit registers (MKS) 403 and 410. QW writes from the SCE are handled differently depending on whether even or odd DW arrives first, as will be discussed in detail herein later.

The cache 427 is based on the concept of "set associativity", wherein a requestor directly addresses several cache slots in parallel and searches a directory 303 (FIG. 2B) for an address to match the desired entry. Specifically, the cache 427 is four-way set associative, which means that part of the logical address points to four slots (sets A, B, C and D) in parallel, and the directory 303 looks for a matching address to point to the one valid set (set A, B, C or D). Thus for the 64K-byte arrays, the logical configuration is actually four identical 16K-byte arrays (one for each set). Each array is 2,048 words deep and 8 bytes (i.e. 1 DW) wide.

The four-way set-associative cache is a compromise between a fully associative cache, in which any block of main storage may map into any position in the cache, and a directly addressed cache, where each main storage address can map into only one location in the cache. Fully associative caches have the highest level of performance of the three kinds listed here, but at the expense of a lengthy directory search time and an elaborate replacement mechanism. Directly addressed caches are the simplest to implement in terms of hardware, but yield significantly lower performance than the other two schemes due to increased overwriting of entries.

Four-way associativity yields very nearly the same performance as full associativity, yet costs relatively little extra in hardware over the directly addressed scheme and can perform the search in parallel, and has a simple replacement algorithm.

The cache 427 is written into from an F-staging register 409 receiving EE data, or from DR0 and DR1 registers 411 and 413 receiving MS data.

The EE sends data to be stored in the cache over a data bus 32a and control bus 32b to the BCE (see FIG. 1). F-registers 401 are a stack of four registers, each of which is eight bytes wide, for stacking up to four DWs to be stored. An F-staging register is loaded with the contents of a selected one of F-registers 401 to be stored into the cache.

Along with each of registers 401 is a MKS register 403 containing mark bits in a mark byte. Each bit of the mark byte, when transferred to MKS 410, identifies a corresponding byte within the cache 427 which is to be modified by a corresponding byte in register 409. Thus, the mark bits in the MKS 410 control the writing of each DW into the cache.

Even and odd inhibit gates 423 and 425 gate to the cache array the mark bytes for even and odd DWs in a line. Also, when the first DW in a line fetch is odd, gates 423 and 425 are used to inhibit the writing into the cache of each non-data DW which may appear at the beginning of the first QW or at the end of the last QW. The reason for this may be understood by reference to FIG. 9C, due to the processor requested DW being accessed as the first DW in the MS line being accessed. Thus, this 1st accessed DW may be located anywhere in relation to the line boundaries which confine the line in MS. Therefore, the DW addresses for the accessed line may wrap-around within the line in accessing the DWs up to the upper line boundary and back to the lower line boundary in the conventional manner. When the first DW of the line has an even DW address (i.e. its DW address bit 28 is 0), the first DW is on a QW boundary, so that the DW sequence can be directly paired off into QWs. However, if the first DW of the line has an odd address (i.e. its DW address bit 28 is odd), the first DW is not on a QW boundary and must occupy the second (odd) DW in a QW in which the first DW in that QW has no data, i.e. it is a non-data DW (see DWX in FIG. 9C). However, the second DW in the line will be on a QW boundary from which the DW sequence is paired off into QWs. The last DW in the line is on a QW boundary and begins the ninth QW, which will have the same QW address as the first QW of the line due to the wrap-around addressing in the line being accessed from MS. But, the last DW in the last QW has no data, i.e. it is a non-data DW (see DWY in FIG. 9C). The odd inhibit gate 425 inhibits the writing of the odd DW in the last QW when nine QWs are used to write the 16 DWs of a line into cache 427. It is not necessary to inhibit the first non-data DW in the first QW when 9 QWs are used, because the 1st and the 9th QW will utilize the same cache accessible unit address; thus the 1st DW in the 9th QW (i.e. DW15) will overlay the first non-data DW in the first QW if it were written. Gates 423 and 425 are enabled for respective DWs between the first and last DWs to allow the marks byte from MKS 410 to control cache writing. The CL bit is set on for a line whenever an IE/EE store request is received.

A storage data bus out (SDBO) register 405 is one DW wide and contains data to be placed in the cache 427 from the SCE. Along with each DW of data is a byte of error-checking and correction (ECC) code. After the data and ECC information are loaded into the SDBO register 405, an ECC logic 407 corrects single-bit errors, detects all double-bit errors and detects some multiple-bit errors in the data before placing it in the DR1 413. Along with the output data, the logic 407 also generates parity bits in lieu of the ECC code.

The DR0 411 and DR1 413 are staging registers which can take two consecutive DWs of data from the SDBO register 405 and broadside load the cache 427 with a QW of data. The DR0 411 always contains an even DW and the DR1 413 always contains an odd DW at the time the QW is written into the cache 427. The DR0 411 and DR1 413 are each eight bytes wide. Note that on QW loads, only half of the QW may actually be written into the cache, due to operation of the odd inhibit gate 425 in the manner previously explained.

Gates 417 and 421 receive even and odd DW's, respectively, from the DR0 411 and DR1 413, respectively, and gate them into the cache 427 in response to an ACPT DRS timing signal from the trigger 257 (FIG. 2A).

Gates 415 and 419 receives a DW of data from the F-staging register 409 and gates them into the cache 427 in response to an ACPT F-STG REG timing signal from a trigger 255 (FIG. 2A). AND VALUE OF BIT 28 (FIG. 2E) determines which DW is written in the cache under mark control.

Cache 427 is organized on a QW basis with each QW having an even DW and an odd DW in each of four sets A, B, C and D for each of the 128 classes.

Cache 427 has four output buses from the sets A, B, C and D for the even DWs and four output busses from the sets A, B, C and D for the odd DW's. The output busses are supplied in a DW read sequence to 4 out of 8 select latches 433, which selects either even DW's (sets A, B, C and D) or odd DW's (sets A, B, C and D) in response to the BCAR bit 28 coming from the BAB 353. The four selected outputs from the 4 out of 8 latches 433 are supplied to a 1 out of 5 select circuit 439, to which a fifth input from a bypass bus 441 is also applied. The 1 out of 5 select circuit 439 selects one of the five inputs (sets A, B, C, D, or the bypass) in response to either cache hit A, B, C, D signal from a hit/miss logic 329 (FIG. 2B) or a bypass to IE signal from a bypass counter and control circuit 233 (FIG. 2A), and gates the selected DW into the IE, and EE, or the DAT.

In a preferred embodiment where the cache 427 is made of an array chip, the bypass path 441 extends inside the array chip. This reduces the I/O pin requirements for the chip.

Figure 10B:
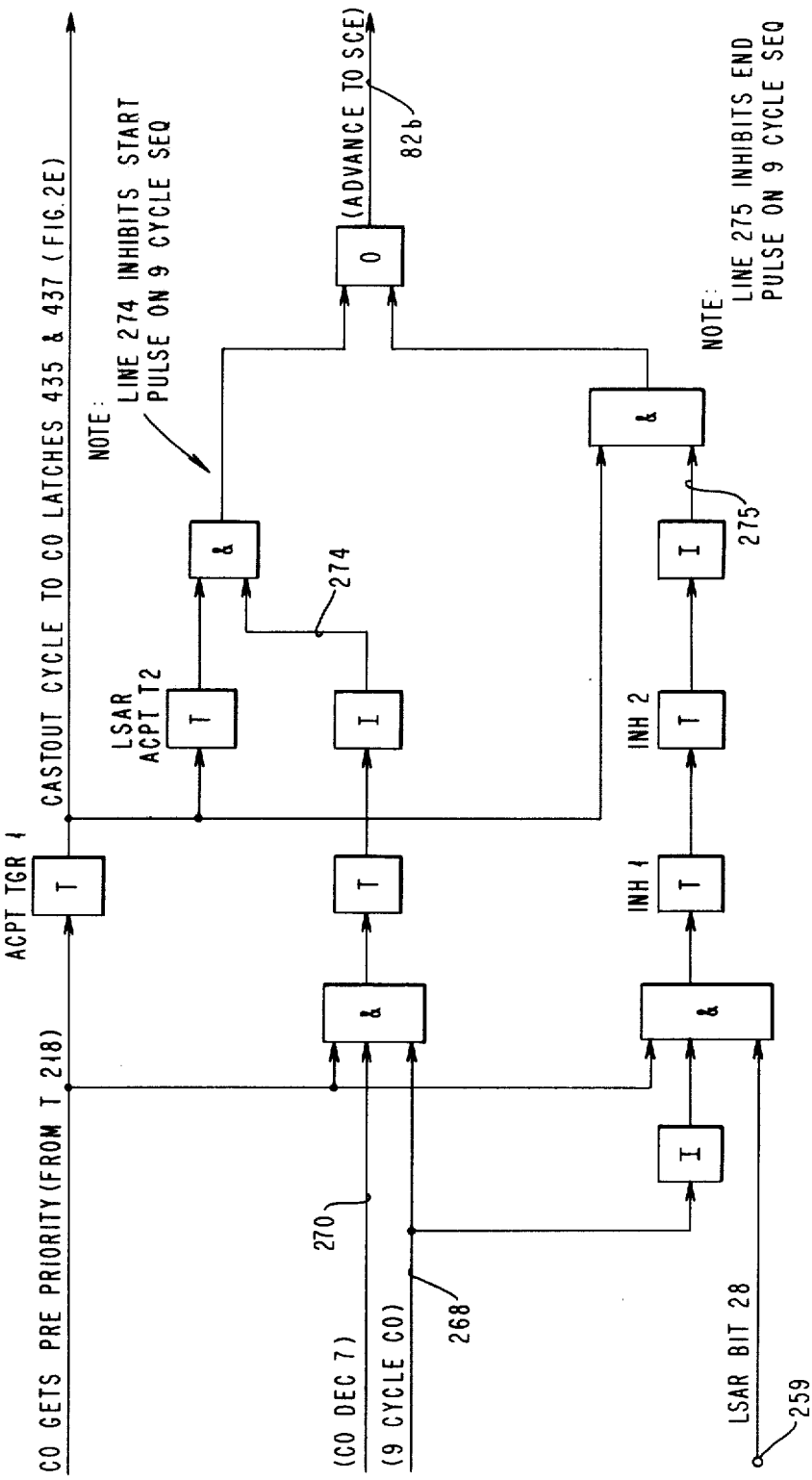

Even DW castouts on the four cache output busses from the even DW sets A, B, C and D are supplied to a 1 out of 4 select circuit 429-E, while odd DW castouts on the four cache output buses from the odd DW sets A, B, C and D are supplied to a 1 out of 4 select circuit 429-O. Circuits 429-E and 429-O both select the same set at one time in response to a decoded value of set identification (SID) bits 0-1 from a decoder 430, so that they jointly output a QW. The odd DW of the QW is supplied to an odd castout latch 435 while the even DW is supplied to an even castout latch 437, as they are ingated by a C-OUT CYCLE signal from a castout sequence control circuit 273 (FIG. 2A). During the input cycle, latch 437 outputs its DW to bus 82a to the SCE. However, the output of latch 435 is then blocked by a gate 439. During the next cycle, gate 439 is enabled by inverter 438 (when it is not receiving a C-out cycle signal) to pass its DW to latch 437 which outputs it to bus 82a. Thus, even and odd DW's are alternately gated to the SCE one DW at a time. The advance to SCE line 82b in FIGS. 2A and 10B signals the SCE for each significant DW on data bus 82a. There is no advance signal for non-data DWs from latch 437.

Referring now to FIGS. 2B and 2C, the cache addressing mechanism will be explained.

The cache 427 is addressed via the buffer address bus (BAB) 353 by logical address bits coming from a requestor into a buffer control address register (BCAR) 301. Typically, this is a logical address, where an upper portion of the address, a logical field, i.e. bits 5-19, is mapped into a page frame of the MS by operating system maintained tables, and lower portions i.e. bits 20-31, is a real address field used to byte index into the page pointed to by the upper portion.

The mechanism by which MS data is transferred to cache 427 is called demand blocking, meaning that a block (i.e. line) of data from the MS is placed in the cache 427 only upon receipt of a request from IE for an entry not found in cache 427, i.e. a cache "miss" occurs. When the BCE searches for an entry in the cache and finds it, a cache "hit" is said to have occurred. The BCE controls the contents of the cache 247 based on a partitioned-least-recently-used (PLRU) algorithm, meaning that when a new block must be loaded into the cache 427, the set (which is pointed to in the addressed class by least-recently-used (LRU) logic 304) will be overwritten with a new line of data from the MS.

The cache directory 303 is an array which contains information about each line entry in the cache 427, namely, an absolute address of the entry (bits 5-19), its protection key (bits 0-3) and various status and control bits including a line valid (v) bit and a change line (CL) bit. Like the cache 427, the directory is four-way set associative. The directory 303 contains 128 classes, each of which has the four sets A, B, C and D associated with it. The 128 classes times four sets per class allows the directory 303 to address the 512 lines that are held in the cache 427. The absolute address locates the 4K byte page containing the line. Bits 18-24 of the address in BCAR 301 locate the selected class in directory 303.

A directory lookaside table (DLAT) 302 is an array which contains the most recently translated page addresses. It is organized as a two-way set-associative array with 256 entries (128 classes, each of which contains an X set and a Y set. It contains in each entry: a logical address (bits 1–12), an absolute address (bits 5–19), a segment table origin (STO) (bits 5–19), and various status bits for each translated page. As each new logical address arrives at the BCE from the IE, its bits 13–19 are used to address the DLAT 302 to select one of its classes. In comparators 305–311, each request's STO and logical address bits 1–12 from BCAR 301 are compared with and LOG field (bits 1–12) of the selected class in the DLAT 302 and a STO from a control register. When a match occurs in comparators 305 through 311 for either the X or Y set in the selected class, it is called a DLAT "hit".

If neither set X or Y obtain a compare equal, a DLAT "miss" occurs. It is signalled from logic 329 to a DAT (dynamic address translator, not shown) which is forced to start an address translation, after which the DAT is a requestor to BCAR 301, and the newly translated address is placed in the appropriate set in DLAT 302.

Simultaneously another comparison continues in comparators 313 through 327 for the selected X and Y absolute addresses from the DLAT 302 and the four selected absolute addresses from directory 303. When no match occurs for any of comparators 313–327, it is called directory "miss" or cache "miss".

Hit/miss logic 329 recognizes when a DLAT or cache miss occurs to cause the BCE to request the line of data from the MS through the SCE, and then sends the data to the requestor.

When a match (i.e. DLAT hit and cache hit) does occur, the DW at address bits 18–28 is gated out of the cache 427 and then sent to the requestor in the case of fetch, or the new data from the EE is gated into that location in the cache 427 in the case of store.

The buffer control address register (BCAR) 301 is a register which receives all incoming logical addresses to the BCE. Once an address is received in the BCAR 301, it can be transferred to one of plural holding registers (not shown) in the BCE, or it can immediately begin accessing the cache directory 303 and the DLAT 302. In front of the BCAR 301 is a priority selection mechanism (not shown) which decides which of plural simultaneous requests will be allowed to load BCAR 301.

When a directory compare operation results in a DLAT hit but cache "miss" (that is, the needed line of data is not found in the cache), one of the two absolute addresses outputted from the selected set in DLAT 302 will be selected by gate 331 for transfer into a first line fetch address register (LFAR1) 337. The selection by gate 331 is of the DLAT set X or Y having its STO and logical address providing a compare equal signal to logic 329. Bits 18–28 from BCAR 301 are also loaded into LFAR1.

Figure 2F:
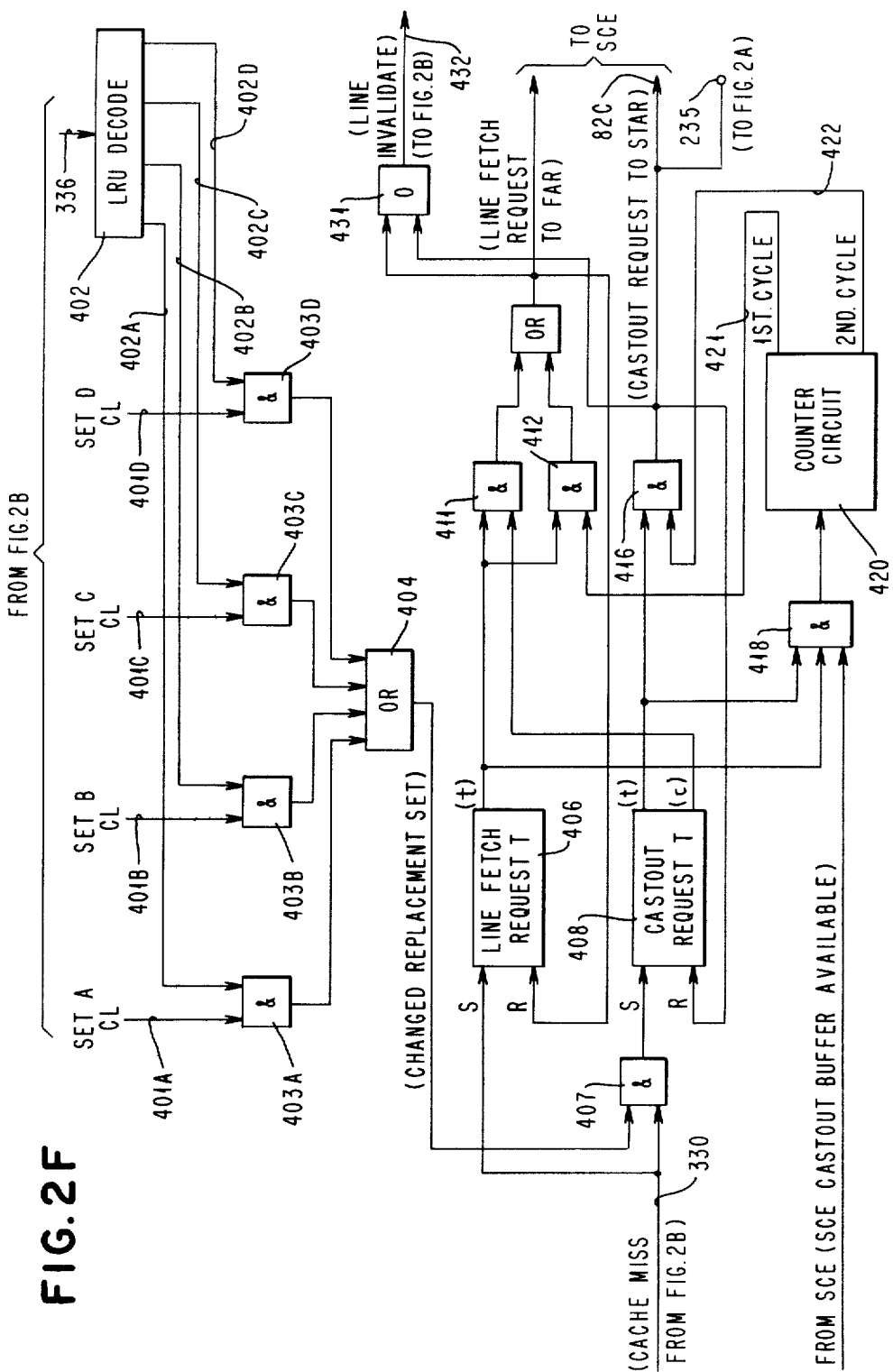

A line fetch request is then initiated by the miss signal on line 330 to FIG. 2F, which sets a line fetch trigger and sends the request address in LFAR1 to a fetch address register (FAR, not shown) in the SCE.

The line fetch request will return a line of 16 DWs from the MS through the SCE in the cache 427 beginning at about 14 cycles after the miss signal occurs on line 330. Each DW in the line fetch is preceeded by one cycle with an advance signal on line 81a (in FIG. 2A). The first advance signal for a line fetch transfers the content of LFAR1 into LFAR2, which makes LFAR1 available for handling a next miss. On the next cycle after the first advance signal, the first DW of the line is received by the BCE, and the LFAR2 341 supplies the cache 427 the SID and the absolute address bits 18–28 via AND gates 350 and 351 and a buffer address bus (BAB) 353. Also, LFAR2 supplies absolute address bits 5–19 to directory 303 to write the new absolute address in the selected class and set entry on the last cycle for the line, at which time the V bit is set on and the CL bit is set off.

Whenever a cache miss occurs, the change line (CL) bit in the status bit field of the selected set in cache directory 303 may be on or off. The CL bit will be on if any data was written into the line, or off if no data was written in the line. If the CL bit is off, an exact copy of the line exists in MS, and the line is overlayed in the cache without being castout. If the CL bit is on, the line must be castout before it can be overlayed because MS does not have a copy of the line.

Whenever a castout is required, the absolute address of the line to be cast out is placed in a line store address register LSAR 335, and a store request is gated to STAR (not shown) in the SCE. The absolute address bits 5–19 in the LSAR 335 are obtained from the directory 303 through a gate 332 at the time the cache miss is detected. Absolute address bits 20–28 are obtained directly from BCAR 301. The LSAR 335 supplies absolute address bits 18–25 to the cache 427 to read the line out for transmission to MS.

The circuitry in FIG. 2F determines whether a castout is required when a cache miss occurs. A line fetch trigger 406 is set whenever a line fetch signal is provided on line 330. Trigger 406 is reset when its output signal gates the LFAR1 address to FAR (not shown) in the SCE.

In FIG. 2B, a change line (CL) bit is in the status field associated with each line. The CL bit is set whenever the processor stores one or more bytes into the associated line of data in the cache. In FIG. 2F, the lines 401A, B, C, D respectively receive the electrical states of the respective CL bits for the class being currently addressed in directory 303. An LRU decode circuit 402 is connected to the LRU output from the addressed class, and one of its outputs 402A, B, C or D is activated to indicate which set in the addressed class is to be selected for the next castout. AND circuits 403A, B, C, D respectively receive the inputs from lines 401A, B, C, D and 402A, B, C, D. Only one of AND circuits 403A, B, C, D may be activated, and it will be the one of AND circuits 403 receiving both the active LRU output and an active CL bit state.

The castout signal is generated by an AND circuit 407 when it receives the output of OR circuit 404 and also receives a cache miss signal on line 330. A castout request trigger 408 is set by an output from AND circuit 407 when a castout is required.

The circuits 411–420 synchronize and prioritize the line fetch and castout signals because if the castout trigger 408 is set, it is set in the same cycle that the line fetch trigger 406 is set. Circuits 411–420 assure that the castout signal is sent to the SCE on the cycle after the line fetch signal is sent to the SCE. This assures that the line fetch request will get to MS before the related castout request. Therefore, a castout request cannot delay its related line fetch by causing MS to first do an access for the castout. In the meantime, the castout can proceed by transferring its line from cache 427 to a line castout buffer (not shown) in the SCE. As a result, the fetch time (which is critical to processor performance) is not increased by any castout.

Thus, in FIG. 2F, AND gate 411 transfers a line fetch signal to FAR if there is no castout required. If a castout is required, gate 411 is deactivated by the complementary (c) output of the castout trigger 408 which is then in a set state. The true (t) outputs of triggers 406 and 408 are respectively conditioning AND gates 412 and 416, which have their other inputs recpectively activated on first and second cycles by outputs of a counter circuit 420 which counts to two on consecutive cycles. Circuit 420 is activated by an output of an AND gate 418 which is conditioned by the true (t) outputs of triggers 406 and 408 and by a line from the SCE which is active when the SCE line castout buffer (not shown) is available. As a result, gate 412 is activated first, and gate 416 is activated on the next cycle.

An LF or CO request signal is also provided to an OR circuit 431 which outputs a signal on line 432 that invalidates the currently addressed line in the cache by setting its valid (V) bit off in the directory 303.

EE store requests to the cache are pipelined in the four F registers 401 shown in FIG. 2D. Each store request is held in a push down store address register (PDSAR) 333 in FIG. 2C which receives the requested logical address directly from BCAR 301.

A set identification (SID) gating control 334 receives the cache bit A, B, C, or D signal from the hit/miss logic 329 and an output from the LRU logic 304 to select proper SID bits, which are fed to SID bit positions 0-1 of the PDSAR 333, LSAR 335 and LFAR1 337, respectively. The SID bits are gated through gates 346, 348 and 350 which are associated with the gates 347, 349 and 351, respectively, to a SID bus 354 associated with BAB bus 353.

The buffer address bus (BAB) 353 is an address-gating network for cache addresses. It selects one of four possible sources of cache addresses by means of gates 345, 347, 349 and 351, which are controlled by a priority circuit arrangement shown in FIG. 2A that determines during each cycle which one of plural access requests will be able to access the cache. The priorities from highest to lowest are:

1. LFAR gates 350,351 (line fetch QW write into cache).
2. LSAR gates 348, 349 (castout QW read from the cache).
3. PDSAR gates 346, 347 (requested DW store into the cache).
4. BCAR gate 345 (requested DW fetch from the cache).

Note that the circuitry in FIG. 2F controls request priorities between related line fetch and line castout requests made during the same cycle, while the circuitry in FIG. 2A controls cache access priorities among related and unrelated access requests made during the same cycle to the cache.

Now referring to FIG. 2A, the cache access priority control circuitry is next explained. Whenever a line fetch is being provided, an advanced line fetch signal is received at a terminal 201 from the SCE one cycle in advance of each DW in the line fetch being received by SDBO 405 in FIG. 2D. The advance signal is applied to a trigger 203, and an output from the trigger 203 is supplied to an 8 or 9 cycle control 205, an advanced DW counter 209, and a bypass counter 233.

Triggers shown with a single input are set for one machine cycle by a signal on its input. That is, the trigger is reset in the conventional way during the next machine cycle. A sequence of single input triggers provide an output which is the input signal delayed one cycle for each trigger in the sequence. Triggers shown with two inputs, S and R, are set by a signal on its S input and remain in set state until a reset signal is received on its R input.

An advance DW counter 209 is a 4 bit counter which is initially set to "0000" and counts up the sixteen advance line fetch signals from the trigger 203. A decoder 211 decodes the count states of counter 209.

The 8 or 9 cycle control 205 receives the advance line fetch signal via the trigger 203, the decoded outputs from the decoder 211, and the LFAR bit 28 via a terminal 207 to signal either 8 QW cycles or 9 QW cycles for the line fetch depending on whether an even DW or odd DW is addressed first. That is, the data may conceptually be considered to be entered into cache 427 in QW groups which are aligned on QW boundaries in MS. As previously stated, each QW is comprised of two DWs, in which the DW address bit 28 is 0 for the even DW and 1 for the odd DW. Since the first LF DW (i.e. the requested DW) may be any DW in a line, it need not be on a QW boundary. If the first DW has an address bit 28 of 0 which is on a QW boundary, then the line of 16 DWs will occupy 8 QWs. But if the first DW of the line has an address bit of 1, then the first DW will be the only DW (i.e. the right-most DW) in the first QW for the line, and the last DW in the line will be the leftmost DW in the 9th QW for the line. Hence, if the request address bit 28 is even, there will be 8 QWs accessed in the cache; but if address bit 28 is odd, there will be 9 QWs accessed in the cache. Thus, control 205 outputs a sequence of 8 or 9 pulses to time the resulting number of QWs. The circuitry in the LF 8 or 9 cycle control 205 is shown in detail in FIG. 9A, and its waveforms are illustrated in FIG. 9B.

The bypass counter controls a cache bypass to the IE that bypasses up to 3 DWs to the IE via the bypass path 441 (FIG. 2E). The number of bypassed DWs is variable and depends on the type of request. A store request does not have any DWs bypassed, a DAT (dynamic address translation) fetch request bypasses only the first DW in the line (i.e. the requested segment or page table entry) to the DAT unit, and other fetch requests bypass only the first three DWs of their line. By terminating the bypass operation as soon as possible, the cache may become available sooner for IE/EE accesses. The bypass operation on line 441 occurs as long as a signal is active on a line 234 from bypass counter 233.

The particular number of bypassed DWs for a given line is controlled by the line fetch bypass setup control circuitry in FIG. 2G. AND gates 451, 452 and 453 respectively receive store requests, DAT fetch requests, and IE fetch requests, and all of these gates received each cache miss signal on line 330. The output of each AND gate respectively activates a different encoder 456, 457 and 458 to cause OR circuits 461 and 462 to set the bypass counter 233 with signals 0,0 or 0,1 or 11. Bypass counter 233 then counts down to 0,0 to control the number of DWs permitted over bypass bus 441.

Control 205 also provides a last DW output at a terminal 206 which is used by the cache directory to make an entry for a new line.

An output 213 of the 8 or 9 cycle control 205 provides a line fetch priority request to a high priority (H) input of a LF/CO pre-priority circuit 215. Line 213 also provides a gate DR's to cache signal to a trigger 257.

The LF/CO pre-priority circuit 215 is a conventional priority circuit which gives highest priority to the input at its H terminal and low priority to an input at its L terminal. Thus, the received line fetch priority request is always given higher priority by being outputted to set a trigger 217, which in turn sets a trigger 219 to signal that a QW is to be accepted into the addressed line position in the cache 427.

The output from trigger 219 is used to condition the gates 350 and 351 (FIG. 2C) to gate the contents (SID bits 0–1 and bits 18–28) of the LFAR2 341 to the bus 354 and the BAB 353.

Thus the output of trigger 219 indicates the cache acceptance of a line fetch (LF) QW write cycle, which can occur only every other advance cycle because of the operation of cycle control 205.

The output of trigger 219 is also provided to terminal 220 to increment the LFAR2 bits 25–27 via a +1 incrementer 343 (FIG. 2C) each time a QW of data is written into the cache.

When a castout request signal is outputted from FIG. 2F at terminal 235, it sets a castout-in-progress trigger 237 in FIG. 2A. An output of trigger 237 is provided to a CO priority request gate 241, which when activated outputs a CO priority request to the L input terminal of the LF/CO pre-priority circuit 215. If there is no LF priority request at the H input terminal, the castout priority request at the L input terminal is accepted by circuit 215, which sets a trigger 218, which then sets a trigger 221 to produce a BAB accept LSAR signal, which is used to condition the gates 348 and 349 (FIG. 2C) to gate the contents (SID bits 0–1 and bits 18–28) of the LSAR 335 to the bus 354 and the BAB 353.

Thus, the output of trigger 221 indicates the cache acceptance of a castout (CO) QW readout cycle, which cannot occur when a LF QW desires the cycle, because of its higher priority and also can only occur every other cycle because of the operation of a CO cycle control 267.

Also, an output of trigger 221 is provided to +1 incrementer 339 in FIG. 2C to increment the QW address in LSAR each time a CO QW is to be read out of the cache.

The castout accept signal from trigger 218 is also fed to a castout 8 or 9 cycle control 267, which further receives LSAR bit 28 via a terminal 259; cycle control 267 is shown in detail in FIG. 10A. Like the LF8 or 9 cycle control 205 previously described, the CO cycle control 267 also generates QW timed pulses, but for the castout line instead of for the line fetch. It likewise generates 8 sequential pulses if the first DW of the castout line is even, or generates 9 sequential pulses if the first DW of the castout line is odd.

A castout sequence control 273 receives the 9 cycle CO signal from control 267 and produces an advance to SCE signal 82b, and a castout cycle signal to castout latch 435 and 437 (FIG. 2E). Castout sequence control 273 is shown in detail in FIG. 10B.

Also receiving the pulsed output of control 267 is a CO counter 265, which is a 3-bit counter which is initially set to "000". It counts castout QW read accepts. A decoder 269 activates one of its output lines 0 to 7 according to the output count from counter 265. A signal on line 270 which indicates when the last QW for a castout line is being transferred. A gate 271 receives line 270 and in turn resets trigger 237 to indicate a castout is no longer in progress. Like 270 is fed back to initialize the CO 8 or 9 cycle controls 267.

The gate 241 receives the castout in progress output from trigger 237 and further receives an output from an inverter 239 which is connected to castout request priority output of trigger 218. Thus, the line castout accept rate is limited to no more than alternate cycles. FIGS. 10C and 10D illustrate the waveform operation of these castout timing circuits.

In FIG. 2A, a BCAR request timing signal (e.g. from the IE/EE, DAT or some other source) is also provided to terminal 247 which is connected to a trigger 249. The output of trigger 249 is fed to the L (lower priority) input of a BCAR priority circuit 251, which is a conventional two input priority circuit. The H (higher priority) input of circuit 251 is actuated by the timing for each cache LF QW access, each cache CO QW access, and each cache DW bypass. These timing signals are provided by the output of a trigger 245 which is triggered by the output of an OR gate 243. OR circuit 243 receives the bypass DW timing signal from counter 233, and the LF QW timing signal from cycle control 205. Therefore, OR circuit 243 provides an output which sets a trigger 245 with the timing of each cache QW line fetch access, cache QW castout access, and cache DW bypass.

Priority circuit 251 provides an output when a cache access cycle is to be given to a BCAR request, which may be a BCAR fetch or store request. Since only one BCAR request exists in BCAR 301 at any one time, there is no contention between a BCAR store request and a BCAR fetch request. The output of circuit 251 is provided to both AND gates 253 and 254 which distinguish whether the BCAR request is a fetch or store request. If a store request, gate 253 sets a trigger 255, which in turn sets a trigger 256 to provide a BAB store accept PDSAR signal, which conditions the gates 346 and 347 (FIG. 2C) to gate the contents (SID bits 0–1 and bits 18–28) of the PDSAR 333. Also, trigger 255 outgates an accept F-staging signal to the gates 415 and 419 (FIG. 2D) to provide the DW contents of the F-staging register 409 to both the even and odd sides of the cache 427. However the DW is written into only one of the cache sides due to the marks control 426 (Fig. 2D) enabling only the even or odd input according to the setting of bit 28 from PDSAR 333 on bus 353.

When a BCAR fetch request gets a cache access cycle, AND gate 254 is enabled and sets a trigger 258 which sets a trigger 259 to provide a BAB fetch accept BCAR signal to gate 345 (FIG. 2C) so that cache 427 can output the required DW to bus 31 when a IE fetch request obtains a bit in the cache.

Having described the configuration of the BCE and the functions of the respective elements, the functional operations of the BCE will now be discussed in more detail.

The DLAT/directory compare operation is discussed first. In normal operation, each request to the BCE eventually is granted priority and its associated address is loaded into the BCAR 301. Once in the BCAR 301, the address selects one class in the DLAT 302 and another class in the cache directory 303. The two sets in the selected class in DLAT 302 have their logical address and STO fields compared by the comparators 305 to 311 with the logical address in the BCAR 301 and the active STO in a control register. If either set compares equal, a DLAT hit select output 338 is provided by logic 329 to a gate 331 to indicate which set compared equal. Thus, the absolute addresses are gated out of both DLAT sets (X and Y) to the further comparison logic comprising the comparators 313 to 327 and the gate 331.

While the DLAT selected class is being examined, the four sets A, B, C, and D in the directory selected class are also being examined in hit/miss logic 329. A cache hit occurs in the directory 303 for set A, B, C, or D if logic 329 determines: (1) the absolute address contained in any directory set matches the absolute address read out of either set X or Y in the DLAT 302, (2) the valid bit is on in the status field for that set, and (3) a damage bit in the status field is off. At this time, the logical address has already been sent from the BCAR 301 through the BAB 353 to the cache 427. The hit/miss logic 329 that looks for the matching DLAT and directory set then provides a cache hit A, B, C or D signal, which points to the set having the hit in the cache 427; and, in the case of fetch, it gates out the data from the hit set to the requestor, or in the case of store, gates in the data in the F-staging register 409 to the hit set. The LRU bits in both the DLAT and the directory are updated to reflect the new reference.

The line fetch and line store operations may be summarized as follows:

Line Fetch Summary

Line fetches are initiated by the BCE when a cache miss occurs and the line fetch trigger 406 is set in FIG. 2F. Line fetches are performed on a two-step basis within the BCE. The first step involves placing the absolute address of the line to be fetched into the LFAR1 337 along with a SID of the cache slot which it is to be placed into. As explained with FIG. 2F, the SID comes from the LRU logic 304 and the SID control 334 and points to the least-recently-used set in that class. The line fetch is initiated by setting the line fetch trigger 406. At the time of the first advance signal from MS to the BCE, the contents of the LFAR1 337 are transferred to the LFAR2 341, freeing up the LFAR1 337 for a new request. The LFAR2 341 supplies the cache address in order to write the new line into the cache, incrementing via an incrementer 343 as each QW address is written. During the last DW return for the line, the LFAR2 341 also updates the directory 303 with the new line address and status bits.

Line Store Summary

A line store is often referred to as a castout. Castouts are initiated either by the SCE in response to a request by another processor (not shown) or by the local processor when its LRU algorithm requires a location in the cache to be driven up to make room for a new line. It is the process used to transfer a line of data from the cache 427 to MS when the line has been changed in the cache. A castout is initiated by setting the castout request trigger 408 in FIG. 2F. Should a castout be necessary to open a cache slot for a needed line of data, the absolute address of the line to be castout is placed in the LSAR 335 and the SID of the least-recently-used set in the addressed class is placed in the bit positions 0-1 to point to a proper set to be castout. The LSAR 335 also addresses the cache to read the castout data, being incremented via the incrementer 339 on each QW read. Once the address of the line to be cast out is placed in the LSAR 335, a store request is made to the SCE over a command bus 82c from FIG. 2F.

In order to maintain the MS integrity of changed data in the cache whenever a line fetch requires a castout, the castout of the changed line begins in the cache before the line fetch can store any data in the line. The control logic sequences the cache reads and writes so that each QW is read out of the cache well before each new QW from MS is written into its place in the cache. At the end of the line fetch, all 16 DWs will have been exchanged.

If a line selected by the LRU controls for replacement has not been changed in the cache, the line is not castout because MS already contains an identical copy of the line at the request address. Then the cache miss causes a line fetch to write the new line of data over the least-recently-used line without any castout.

The fetch and store operations will now be explained with reference to timing charts.

Normal Fetch Request (DLAT Hit and Cache Hit) (FIG. 3)

For an IE fetch request during a cycle F, assuming no contention, data is returned to the IE on the second cycle C2 following the request, if both cache and DLAT hits occur. As can be seen in FIG. 3, fetch requests to the BCE are pipelined and can be received at a rate of one per machine cycle to return a DW on each cycle as long as DLAT and caches hits are obtained.

After a fetch request occurs in F cycle, the BCAR 301 is loaded at the beginning of the C1 cycle. The DLAT compare and the directory compare are done during the C1 cycle. By the end of the C1 cycle, it is known whether or not the real address was found. If a hit occurs, the hit A, B, C or D (HIT SID) signal is sent to the cache 427 and the data is returned on the C2 cycle to the requestor.

Delayed Fetch Request (DLAT Miss and Cache Hit) (FIG. 4)

In the case of a DLAT miss, the IE receives a "delayed fetch" signal in place of the expected data on the C2 cycle. At the same time, the dynamic address translator (DAT), not shown, starts its translation sequence. When the translation routine is finished, a second C1 cycle causes the DAT to load the BCAR with the original virtual address that previously caused the DLAT miss, and writes the translated entry in the DLAT on the LOCK cycle. Then an advance (ADV) cycle sends an IE advance signal to the IE, which again loads the request into BCAR on a C1 cycle and the data is read-out on the C2 cycle.

Line Fetch Request (DLAT Hit and Cache Miss) (FIG. 5)

In the case of a cache miss, the directory search would not yield a valid set on the C1 cycle, the address in the BCAR 301 would be loaded into the LFAR1 337 on the C2/DLY cycle, and a line fetch request is sent one cycle later on a 1st DLY cycle to the MS and SCE. Some time later, depending upon contention, the BCE receives an advance signal (1st MS Adv) which indicates that the first of 16 DWs of data will return two cycles later to the SDBO register 405 from the MS. On the last DW of data for the line, the BCE updates the directory 303 with the status, key and absolute address of the new line.

Note that the example of FIG. 5 shows only a simple case in which one DW is bypassed via the bypass path 441. Up to 3 DWs may be bypassed. Also, in the example of FIG. 5, it is assumed that the first DW (DW #0) returned to the SDBO register 405 is an even DW (i.e. its address bit 28 is 0). Thus, a QW (DW #0 and DW

1) is written into the cache 427 on the first write cycle-0 and seven more QWs are written to complete a line of 16 DWs. If the first DW returned is an odd DW (i.e. its address bit 28 is 1), only the first DW is the only DW contained in the QW written into the cache 427 on the first write cycle-0, requiring a total of 9 write cycles, instead of the 8 write cycles when the first DW had an even address. Thus, in FIG. 5 the last write cycle n is 9 if the request address is odd, but is 8 if the request address is even.

Also note that a QW write to the cache occurs every other cycle, while a DW is loaded to the SDBO and occurs every cycle. This alternate write cycle allows other requests to have efficient access to the cache between the write cycles.

Normal Store Request (DLAT Hit and Cache Hit) (FIG. 6)

All IE store requests to cache are preceeded by a fetch request signal with a store modifier signal to the same address as the actual store operation. This is called pretesting; it is done automatically by the IE. Its purpose is to avoid having exceptions occur unexpectedly on the store operations. In essence, the fetch request with a store modifier signal tests the address for the various exceptional conditions so that when the store comes along, it can proceed unhindered by presuming no exceptions. The only problem that may occur on a store is a cache or DLAT miss, which simply delays the operation while the line fetch or translation is done.

A store request begins with an S cycle with the IE placing the address of the location to be altered in the BCAR 301 while the EE places a DW of data to be stored in one of the F-registers 401. The store requests may be pipelined in registers 401 as seen in FIG. 6. During the C1 cycle, the directory 303 is interrogated and the hit class is noted. At the beginning of the C2 cycle, the logical address bits 18–28 are placed in the PDSAR 333 and are used to address the cache 427. The IE sees the same interface protocol for the store operation as for the fetch operation. A major difference between the two operations is that the store does not return exceptions to the requestor, but the fetch may.

When a store is completed in the cache 427, this BCE has the only valid copy of the line of data in the entire system. Prior to the store, the BCE will have had to fetch the line of data from MS. Eventually, the changed line will be put in the same address in MS.

When the data is written into the cache 427 the change line (CL) bit is turned on. If a change line bit is off, the BCE sends a request to the SCE to turn on a corresponding change line (CL) bit in a copy of the directory in the SCE.

Store Line Fetch Request (DLAT Hit and Cache Miss)

When a store operation causes a miss in the cache, the absolute address of the requested DW is copied from the DLAT 302 into the LFAR1 337, and a command for a line fetch is sent to the SCE and then to MS. After the data is returned from the SCE, the store operation proceeds as if it were being started from the beginning, that is, the C1 and C2 cycles will both occur; and on the C2 cycle, the data in the F-register 401 is written into the cache.

The BCE can stack the data for up to four IE store requests in the four F registers 401. If the BCE cannot handle a store request because the BCAR 301 is processing a BCE request with higher priority, it returns a BCE busy signal to the IE. When the BCAR 301 is not tied up on other requests, the IE can stream store requests to the BCE every cycle, as long as facilities to hold the requests are available.

Overlapped Cache Accesses

FIG. 7 illustrates the BCE's ability to interleave a line fetch with a castout. By alternating QW cache reads and cache writes, the BCE can transfer a DW on every cycle. The illustrated example presumes that an even DW is addressed first. In this case, 8 QW cycles for reading a line of data. If an odd DW was first, the data transfer would require a total of 9 QW cycles. Also note that the line fetch illustrates the maximum case of the first three DWs being bypassed to the IE requestor. The bypass cycles overlap both the read and write cycles in FIG. 7 at the beginning of the line fetch. Note from FIG. 7 that reading QWs from the cache takes place on cycles 1, 3, 5, 7, while writing QWs in the cache takes place on cycles 2, 4, 6 and 8.

Note also that the alternate cycles used in FIG. 7 for the castout read cycles (between the line-fetch write cycles) would not be used for castout if no castout were required, such as if the line being replaced by the line fetch had not been changed. Perhaps 75% of the replaced lines will not have been changed. Therefore the alternate cycles between the line-fetch write cycles are available when there is no cache bypass for cache access other than castout.

After the cache bypass cycles end, any available alternate cycles (e.g. not being used for castout) may be used to access available data in the Cache as the C2 cycle of either a normal IE fetch request (FIG. 3) or a normal EE store request (FIG. 6). In this manner the IE/EE may access the cache concurrently while a line fetch is being performed by the cache.

Also a line castout may occur without a corresponding line fetch due to an invalidate request from I/O or another IE desiring to access data in MS or in another cache. In this case, the alternate cycles between the castout read cycles are available for the local IE/EE to access data available in the cache using the C2 cycle of a normal fetch or store request.

Further, the IE may use any available alternate cycle to test the cache directory 303 for a key exception or a translation exception.

In FIG. 8, cycle timings (A), (B), (C) and (D) show an example of two sequential cache misses 1 and 2, each requiring a castout. Miss 1 results in 8 QWs in its castout (CO) and line fetch (LF) cache accesses due to this request having an even address, and has 3 bypass (BP) DWs. Miss 2 results in 9 QWs in its castout and line fetch cache accesses due to this request having an odd address and has no bypass operation. It is assumed that the first DW of a line fetch request is received by the cache bypass bus 441 on the 15th cycle after the miss is detected by the cache directory, and that its first LF QW occurs on the 16th cycle after the miss. It is also assumed the storage address register (STAR) is available in the SCE and therefore the first CO QW is read-out of the cache on the third cycle after the miss. Each cycle indicated with a P in cycle timing (B) represents a cycle available to the IE/EE for a cache access, because the cycle is not being used for a CO QW, LF QW, or BP DW.

Also during cycle 35 (when it might be expected that CO QW8 would be read from the cache), it is noted that LF QW1 writes into the cache, because the priority circuit 215 in FIG. 2A gives an LF QW access priority over a CO QW access of the cache. As a result, the last castout access, CO QW8, is delayed until cycle 38, when it contends with LF QW2 during cycle 37.

The castout cycle control 267 may be simplified in some uniprocesses by eliminating the 9 cycle control. Thus, 8 cycle control of castouts may suffice for a uniprocessor in which any line castout begins with DW0 and DW1 as the first QW of the line being castout. The channel in such a uniprocessor should have marks write control in its main storage to handle channel changes to a castout line.

However, uniprocessor operation requires both the 8 or 9 cycle control 267 for castouts when maximum channel performance is required. That is, the described castout 8 or 9 cycle control 267 first casts out the particular DW requested by the channel which is in a line that has been updated in a cache; but if only 8 cycle operation were used, the first castout DW would not necessarily be the requested DW. Also, where the channel marks control is in the SCE and not in MS, each castout DW requested by the channel is modified by the channel in the SCE, so that only the channel updated castout DW is stored in MS. This reduces the necessity for storing the DW twice in MS, which may happen where only an 8 cycle castout control 267 is provided.

The 8 or 9 cycle control 267, as described, is also needed for multiprocessor operation when the castout is directly transferred to another requesting processor, so that the other processor can receive its requested DW as the first transferred DW of a line to provide the fastest response to the other processor.

While the invention has been particularly shown and described with references to a preferred embodiment thereof, it will be understood by those skilled in the art that the foregoing and other changes in form and details may be made therein without departing from the spirit and scope of the invention.

Having thus described our invention, what we claim as new and desire to secure by Letters Patent is:

1. A cache accessing system for a store-in cache for enabling a processor to have fast access to any transfer unit of data in the cache, each line of cache data being addressed on a main storage (MS) line address boundary, each line being comprised of plural transfer units, each transfer unit being addressed on a MS transfer unit address boundary, the cache accessing system comprising:
a cache array containing a plurality of cache accessible units, each cache accessible unit have a plurality of transfer units, each access of the cache in one cache cycle capable of accessing the plurality of transfer units comprising one cache accessible unit,
directory means for receiving cache access requests and connected to the cache array for controlling the addressing of the cache for each cache accessible unit required by a request,
cache registering means for registering plural transfer units into a cache accessible unit,
first cache bus means connected to the cache registering means for transferring one transfer unit per cycle from a first source to the cache registering means,
cache write accessing means for writing into each cache accessible unit from the cache registering means at an addressed location in the cache in one cycle,
cache read accessing means for reading an accessible unit out of the cache in one cycle,
second cache bus means for outputting one transfer unit per cycle from the cache reading means to a second source,
cycle control means connected to the cache for controlling cache accesses an alternate cycles by the cache write accessing means and by the cache read accessing means,
the first bus means and second bus means being capable of simultaneously transferring the transfer units on the same cycle in which either the cache write access means or the cache read access means is accessing an accessible unit in the cache,
whereby the cache access rate being equal to the combined transfer unit rates on both the first and second cache bus means.

2. A cache accessing system as defined in claim 1, further comprising:
the first source being MS providing a line fetch of data to the cache, and
the second source being a processor accessing a transfer unit of data in the cache between the writing in the cache of accessible units from the first source.

3. A cache accessing system as defined in claim 1, further comprising:
the second source being the cache providing a castout line of data to MS, and
the first source being MS providing a line fetch of data to the cache by writing accessible units into the cache between the reading of accessible units from the cache for the second source.

4. A cache accessing system as defined in claim 1, further comprising:
the second source being the MS receiving a line fetch of data from the cache, and
the first source being a processor accessing a transfer unit of data into the cache between accessible units read from the cache to the second source.

5. A cache accessing system as defined in claim 2, further comprising:
bypass means connected between MS and the processor for bypassing the cache for the transfer of one or more transfer units while the line fetch of data is being written into the cache from the first source, and
means connected to the bypass means for stopping further transfer on the bypass means after the transfer of a selected number of transfer units.

6. A cache accessing system as defined in claim 5, further comprising:
means connected to the stopping means for enabling cache accesses for other processor requests on alternate cycle after the stopping means stops transfers on the bypass means and no castout line is being transferred.

7. A cache accessing system as defined in claim 1, further comprising:
castout signalling means for signalling a request for a castout to the directory means, the line being subsequently transferred on a bus to main storage (MS bus-in) as one transfer unit cycle until the entire line is transferred, means for connecting the MS bus-in from MS to the second cache bus means, the second cache bus means providing one transfer unit during each alternate cycle to the MS bus-in until the entire line is outputted, whereby the cache is available to be accessed concurrently by another requestor during the cycles between the cache read cycles for the line castout.

8. A cache accessing system as defined in claim 7, further comprising:
means connected to the directory means for invalidating information about the castout line in the directory means before the castout is completed, whereby the processor can no longer access the castout line.

9. A cache accessing system as defined in claim 8, further comprising:
cache access priority control means connected to the cache accessing system for prioritizing each cache access cycle with highest priority being given to a line fetch cache access, next lower priority being given to a line castout cache access and still lower priority being given to a processor request cache access, and
means for actuating the cache read accessing means to read out from the current line position one cache accessible unit on each alternate cycle in which line castout cache access priority is given.

10. A cache accessing system as defined in claim 1, further comprising:
castout signalling means for signalling a request to the directory means for a line of data,
the cache read accessing means transferring the line to the second cache bus means by transferring one accessible unit each alternate cycle, and the second cache bus means transferring one transfer unit on consecutive cycles, until the entire line is transferred,
whereby the cache is available to be accessed concurrently by another requestor between the alternate cycles by the cache read accessing means.

11. A cache accessing system as defined in claim 10, comprising:
line fetch cycle control means connected to the cache for generating the timing of each cache access cycle for the line fetch, in which each timing cycle enables the accessing in the cache of a cache accessible unit during alternate cycles, the cycle control means including
first phasing means actuated by an advance signal for the requested first fetched unit of a line addressed on an accessible unit address boundary and generating cache access timing cycles phased with the first fetched transfer unit in each accessible unit provided to the cache write accessing means, the first phasing means generating a number of cache access timing cycles equal to one-half of the number of transfer units in the line,
second phasing means actuated by an advance signal for the requested first fetched transfer unit which has an address not on an accessible unit address boundary and phasing the cache access timing cycles with the second fetched transfer unit which is on an accessible unit boundary, and generating one more cache access timing cycle than the number of cache access timing cycles generated by the first phasing means.

12. A cache accessing system as defined in claim 1, in which
the transfer unit is a doubleword, and the accessible unit is a quadword.

13. A cache accessing system as defined in claim 12, in which
the line comprises sixteen doublewords.

14. A cache accessing system as defined in claim 1, further comprising:
cache miss detection means connected to the directory means for signalling a request for a line fetch, the line being subsequently transferred on a bus from main storage (MS bus-out) as one transfer unit per cycle until the entire line is transferred, means for connecting the MS bus-out from MS to the first cache bus means,
the cache registering means receiving one or more transfer units of the line in one or more cycles, the cache write accessing means writing all transfer units in the registering means into an addressed location in the cache in one cycle, and means connected to the cache for inhibiting the writing into the cache of any transfer unit content other than the last transfer unit content in the cache registering means only when the first transfer unit of the line is not on an accessible unit address boundary,
whereby the cache is available to be accessed concurrently by another requestor during the cycles between the cache write cycles for the line fetch.

15. A cache accessing system as defined in claim 14, further comprising
a marks control means connected to the cache and operating with the cache write accessing means to control the writing of each transfer unit for the accessible unit in the cache write accessing means,
a last cycle circuit in the cycle control means for outputting a last cycle signal timed with a next cycle after the last cycle in the line fetch when the first transfer unit of the line fetch is an odd transfer unit, which is defined as a transfer unit not on an accessible unit address boundary,
means connecting the last cycle circuit to the marks control to cause all mark positions in a mark byte for an even transfer unit in the cache write accessing means having the last accessed cache accessible unit for the line fetch when the first accessible unit for the line fetch is not on an accessible unit address boundary,
whereby the mark byte prevents the writing in the cache of the even transfer unit in the last accessible unit for the line fetch.

16. A cache accessing system as defined in claim 14, further comprising:
a status field with each line addressing entry in the directory means, the status field including a change line bit which is set whenever any data is changed by the processor in a corresponding line,
line replacement control means connected to the directory means including LRU means for allocating a line location in the cache for a line fetch,
line-change sensing means connected to the line replacement control means for detecting a change bit for a current line occupying the line location,
castout signalling means activated by the cache miss detection means for initiating a castout of the current line to MS if the change line bit indicates a changed status for the current line by transferring the address of the current line to MS,
cache access priority control means connected to the directory means for prioritizing each cache access cycle with highest priority being given to a line fetch cache access, next lower priority being given to a line castout cache access and still lower priority being given to a processor request cache access, means for actuating the cache read accessing means to read out from the current line position one cache accessible unit on each alternate cycle in which line castout cache access priority is given;

means for actuating the cache registering means and the cache write accessing means to write in the allocated line position one cache accessible unit on alternate cycles in which line fetch cache access priority is given, whereby the current line will begin being castout before the related line fetch is written in the same line position in the cache, with no interference between the castout operation and the line fetch operation even though transfer units for both the line fetch and line castout are being transferred simultaneously on the first cache bus means and the second cache bus means.

17. A cache accessing system as defined in claim 16, further comprising:

a cache bypass bus connecting the processor to the first cache bus means, cache bypass select means connected to the cache bypass bus for selecting the number of transfer units at the beginning of each line fetch which are to be transferred on the cache bypass bus from MS to the processor issuing a request causing a cache miss obtaining the line fetch, counter means connected to the cache bypass select means for counting the number of transfer units transferred through the cache bypass bus from the beginning of the line fetch, means connected to the cache bypass bus for stopping the line fetch transfer through the cache bypass bus when the count equals the number of transfer units indicated by the cache bypass select means, whereby the cache bypass means can transfer units simultaneously with the transfer of transfer units on one or both of the first cache bus and second cache bus.

18. A cache accessing system as defined in claim 14 comprising:

line fetch cycle control means connected to the cache registering means for generating the timing of each cache access cycle for the line fetch, in which each timing cycle enables the accessing in the cache of a cache accessible unit, the cycle control means including, first phasing means actuated when the first received transfer unit of the line fetch is on an accessible unit address boundary for phasing cache access timing cycles with the last received transfer unit in each accessible unit provided to the cache registering means, second phasing means actuated when the first transfer unit of the line fetch is not on an accessible unit address boundary for phasing the cache access timing cycles with the first received transfer unit and each other received transfer unit not on an accessible unit boundary and generating one or more cache access timing cycle than the number of cache access timing cycles generated by the first phasing means.

19. A cache accessing system as defined in claim 18, further comprising:

means for connecting the first and second phasing means to an address bit in a line fetch request address, the address bit being at a transfer unit address boundary in the address, the first phasing means being actuated when the address bit has a first state, and the second phasing means being actuated when the address bit has a second state.

20. A cache accessing system as defined in claim 19, in which a zero state for the address bit provides the first state, and a one state for the address bit provides the second state.

21. A cache accessing system as defined in claim 19, further comprising:

advance signal means providing an advance timing pulse prior to the receipt by the cache of each transfer unit in the line fetch, an input of the cycle control means being connected to the advance signal means, advance counter means connected to the advance signal means for outputting transfer unit count signals to the cycle control means to signal the beginning and end of the line fetch.

22. A cache accessing system as defined in claim 19, further comprising:

line replacement control means connected to the directory means including LRU means for allocating a line location in the cache for a line fetch, line-change sensing means connected to the line replacement control means for detecting a changed line status for a current line occupying the line location, castout signalling means activated by the cache miss detection means for intiating a castout of the current line to MS by transferring the address of the current line to MS if the changed line status indicates a modification in the current line, cache access priority control means connected to the cache for prioritizing each cache access cycle with highest priority being given to a line fetch cache access, next lower priority being given to a line castout cache access and still lower priority being given to a processor request cache access, a first priority circuit in the cache access priority control means having a highest priority input connected to an output of the line fetch cycle control means for receiving the cache access timing cycles for a line fetch, a line fetch priority output of the first priority circuit for signalling the timing of the cache access cycles for a line fetch, a castout priority output of the first priority circuit for indicating the times during which cache access cycles may be provided for a castout, which is during alternate cycles when the priority circuit is not outputting a line fetch priority signal, a castout cycle control means for generating the timing of each cache access cycle for the castout of a line from the cache, in which castout timing cycles are provided for enabling the accessing in the cache of a different cache accessible unit in the line for each castout timing cycle in a castout timing sequence, castout control means connecting an output of the castout cycle control means to another input of the first priority circuit, and a castout priority output of the first priority circuit signalling the timing of the cache access timing cycles for each cache access cycle for casting out a line, means for actuating the cache registering means and the cache write accessing means under control of the line fetch priority output of the first priority circuit to write into the allocated line position a different cache accessible unit on each timing cycle in which line fetch cache access priority is given;

whereby the current line will begin being castout before the related line fetch is being written in the same line position in the cache, with no interference between the castout operation and the line fetch operation even though transfer units for both the line fetch and line castout are being transferred simultaneously on the first cache bus means and the second cache bus means.

23. A cache accessing system as defined in claim 22, further comprising:

an OR circuit having at least first and second inputs, with the first input connected to the output of the line fetch cycle control means for receiving the cache access timing cycles for a line fetch, and the second input connected to an output of the castout control means for receiving the cache access timing cycles for a line castout, a second priority curcuit in the cache access priority control means for determining the priority of cache accesses for processor requests in relation to the priority of cache accesses for line fetches and line castouts, one input of the second priority circuit connected to the output of the OR circuit for inhibiting the cache access priority for a processor request, another input of the second priority circuit receiving processor request timing signals, a processor request timing output of the second priority circuit providing a processor request cache access timing cycle when the one input of the second priority circuit is not receiving an output from the OR circuit while the another input of the second priority circuit is receiving a processor request timing signal.

24. A cache accessing system for a store-in-cache permitting concurrent line castout and line fetch transfers with a main storage, comprising:

a storage bus-out and a storage bus-in connected to said main storage, said storage bus-out and said storage bus-in having the same parallel capacity, a fetch register having twice the parallel capacity of said storage bus-out, said fetch register being connected between said storage bus-out and a cache, a store register having twice the parallel capacity of said storage bus-in, said store register being connected between said cache and said storage bus-in, each cache addressable unit in said cache having the same capacity as said fetch register or said store register, cache access means for loading a cache addressable unit into said store register or storing a cache addressable unit from said fetch register for each access, and means connected to said store register and said fetch register for alternately enabling said loading into said store register and said storing from said fetch register.

25. A cache accessing system according to claim 24, wherein;

said fetch register comprises a pair of fetch register halves each having the same parallel capacity as said storage bus-out, said pair of fetch register halves being connected in series with respect to data coming from said storage bus-out and in parallel with respect to data going into said cache.

26. A cache accessing system according to claim 24, wherein;

said store register comprises a pair of store register halves each having the same parallel capacity as said storage bus-in, said pair of store register halves being connected in parallel with respect to data coming from said cache and in series with respect to data going into said storage bus-in.

27. A cache accessing system according to claim 24, wherein;

said fetch register comprises a pair of fetch register halves each having the same parallel capacity as said storage bus-out, said pair of fetch register halves being connected in series with respect to data coming from said storage bus-out and in parallel with respect to data going into said cache, said store register comprises a pair of store register halves each having the same parallel capacity as said storage bus-in, said pair of store register halves being connected in parallel with respect to data coming from said cache and in series with respect to data going into said storage bus-in.

28. A cache accessing system according to claim 24, further comprising;

a cache bypass path extending from an output port of said fetch register to also transfer data being stored into said cache to a requestor of that data.

29. A cache accessing system according to claim 28, wherein;

said cache consists of an array chip, and said bypass path is via a bus entirely contained within said array chip.

30. A cache accessing system according to claim 27, further comprising;

a gate means for transferring the output of said cache to a requestor of cache data, a cache bypass path extending from an output port of one of said pair of fetch register halves to the gate means.

31. A cache accessing system for a store-in-cache permitting concurrent line store and line fetch transfers with a main storage, comprising;

a storage bus-out and a storage bus-in connected to said main storage, said storage bus-out and said storage bus-in having the same parallel capacity, a first fetch register having the same parallel capacity as said storage bus-out, an input bus of said first fetch register being connected to said storage bus-out, said first fetch register being adapted to receive a unit of data of the same parallel width as the parallel capacity of said first fetch register from said storage bus-out on each cycle, a second fetch register having the same parallel capacity as said first fetch register, an output bus of said first fetch register being connected in series to an input bus of said second fetch register, first gate means for gating a unit of data from said first fetch register into said second fetch register on every cycle, a cache comprising a number of cache addressable units each having twice the capacity of said first fetch register or said second fetch register, said output bus of said first fetch register and an output bus of said second fetch register being connected in parallel to said cache, first cache accessing means for enabling parallel loading of contents of said first and second fetch registers into a selected one of said cache addressable units on every other cycle, a first store register and a second store register each having the same parallel capacity as said storage bus-in, input buses of said first and second store registers being connected in parallel to said cache to receive one cache addressable unit of data, at a time, in parallel from said cache, an output bus of said first store register being connected to said input bus of said second store register, an output bus of said second store register being connected to said storage bus-in, second cache accessing means for enabling parallel loading of content of a selected one of said cache addressable units into said first and second store registers on every other cycle not used by said first cache accessing means, and second gate means for gating a block of data from said first store register into said second store register on every other cycle.

32. A cache accessing system according to claim 30, further comprising;

a cache bypass path extending from said output bus of said one of the fetch register halves to transfer a unit of data at a time to a requestor of the block of data.

33. A cache accessing system according to claim 32, wherein;

said cache consists of an array chip, and
said bypass path is via a bus entirely contained within said array chip.

34. A cache accessing system as defined in claim 11, further comprising:

castout cycle control means connected to the cache for generating the timing of each cache access cycle for a line castout, in which each timing cycle enables the accessing in the cache of a cache accessible unit during alternate cycles, the castout cycle control means including, phasing means actuated by a line castout request for phasing cache access timing cycles with transfer units on accessible unit address boundaries for accessing each accessible unit provided to the cache read accessing means, whereby cache castout accessing for a line can be done concurrently with cache line accessing in the same or another line position in the cache.

35. A cache accessing system as defined in claim 11, further comprising:

castout cycle control means for generating the timing of each cache access cycle for a line castout, in which each timing cycle enables the accessing in the cache of a cache accessible unit during alternate cycles, the castout cycle control means being actuated by a line castout request, the castout cycle control means including:

first phasing means actuated when the castout request is for a transfer unit on an accessible unit address boundary, and generating access timing cycles phased with each transfer unit on an accessible unit address boundary, the first phasing means providing a number of cache access timing cycles per line equal to one-half of the number of transfer units in the castout line, second phasing means actuated when the requested first castout transfer unit has an address not on an accessible unit address boundary, and generating the cache access timing cycles with the second castout transfer unit which is on an accessible unit boundary, the second phasing means providing one more cache access timing cycle per line than the number of cache access timing cycles provided by the first phasing means, whereby the castout accessing of a line in the cache begins with the transfer unit requested by an I/O channel or another processor, and performs the line castout concurrently with any line fetch access or processor request access in the cache.

36. A cache accessing system as defined in claim 11, in which the line fetch cycle control means includes the first phasing means generating eight cache access timing cycles per line when the requested transfer unit is on an accessible unit address boundary, the second phasing means generating nine cache access timing cycles per line when the requested transfer unit is not on an accessible unit address boundary.

37. A cache accessing system as defined in claim 34, in which the castout cycle control means provides eight cache access timing cycles for each line castout.

38. A cache accessing system as defined in claim 35, in which the castout cycle control means includes the first phasing means generating eight cache access timing cycles per line when the requested transfer unit is on an accessible unit address boundary, the second phasing means generating nine cache access timing cycles per line when the requested transfer unit is not on an accessible unit address boundary.

39. A cache accessing system as defined in claim 11, the line fetch cycle control means further including last cycle means for signalling to the cache the last cache access timing cycle for a line generated by the first or second phasing means, and last special cycle means for signalling to the cache the last cache timing cycle for a line generated by the second phasing means, whereby the last special cycle means can be used by the cache to inhibit the writing of non-data in a last transfer unit position in the last accessible unit to be written for a line in the cache.

40. A cache accessing system as defined in claim 35, the castout cycle control means further including last cycle means for signalling to the cache the last cache access timing cycle for a line generated by the first or second phasing means, and last special cycle means for signalling to the cache the last cache timing cycle for a line generated by the second phasing means, whereby the last special cycle means can be used by the cache to inhibit the reading of a last transfer unit position in the last accessible unit for the line, the last transfer position being identical to the requested first transfer unit for the line.

* * * * *